US010195587B2

(12) United States Patent
Bakker et al.

(10) Patent No.: US 10,195,587 B2
(45) Date of Patent: Feb. 5, 2019

(54) SYNTHESIS OF HIERARCHICALLY POROUS MONOLITHS BY A CO-GELATION METHOD

(71) Applicant: The Board of Trustees of The University of Alabama, Tuscaloosa, AL (US)

(72) Inventors: Martin G. Bakker, Tuscaloosa, AL (US); Trupti V. Kotbagi, Tuscaloosa, AL (US); Kevin Shaughnessy, Tuscaloosa, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 0 days.

(21) Appl. No.: 15/451,365

(22) Filed: Mar. 6, 2017

(65) Prior Publication Data
US 2017/0252725 A1    Sep. 7, 2017

Related U.S. Application Data

(60) Provisional application No. 62/303,995, filed on Mar. 4, 2016.

(51) Int. Cl.
*B01J 21/18* (2006.01)
*B01J 23/44* (2006.01)
(Continued)

(52) U.S. Cl.
CPC .............. *B01J 21/18* (2013.01); *B01J 23/26* (2013.01); *B01J 23/44* (2013.01); *B01J 23/755* (2013.01);
(Continued)

(58) Field of Classification Search
None
See application file for complete search history.

(56) References Cited

U.S. PATENT DOCUMENTS 3,404,030 A    10/1968  Palmateer
3,737,395 A     6/1973  Arnold et al.
(Continued)

FOREIGN PATENT DOCUMENTS

KR    10-0751504        8/2007
KR    10-20120105823    9/2012
WO    2006055670        5/2006

OTHER PUBLICATIONS

Armbruster et al., "Al$_{13}$Fe$_4$ as a low-cost alternative for palladium in heterogeneous hydrogenation", Natural Material, 2012, 11: 690-693.
(Continued)

*Primary Examiner* — Guinever S Gregorio
(74) *Attorney, Agent, or Firm* — Meunier Carlin & Curfman LLC

(57) ABSTRACT

Disclosed are methods for making monolithic carbon materials as single bodies containing networks of pores in the mesopore and macropores that incorporate nanoparticles of various metals and metal oxides. The disclosed methods have the advantage that such single bodies can be made by mixing the carbon precursors and metal salts together in a single pot followed by appropriate processing. The materials produced are particularly suitable for use as heterogeneous catalysts, particularly in fixed bed and monolithic reactors.

18 Claims, 11 Drawing Sheets

(51) Int. Cl.
| | |
|---|---|
| *B01J 23/755* | (2006.01) |
| *B01J 23/26* | (2006.01) |
| *B01J 35/04* | (2006.01) |
| *B01J 37/03* | (2006.01) |
| *B01J 37/08* | (2006.01) |
| *B01J 37/10* | (2006.01) |
| *B01J 37/16* | (2006.01) |
| *B01J 37/18* | (2006.01) |
| *B01J 35/00* | (2006.01) |
| *B01J 35/10* | (2006.01) |
| *B01J 37/00* | (2006.01) |

(52) U.S. Cl.
CPC ............ *B01J 35/002* (2013.01); *B01J 35/006* (2013.01); *B01J 35/0013* (2013.01); *B01J 35/04* (2013.01); *B01J 35/1019* (2013.01); *B01J 35/1042* (2013.01); *B01J 35/1061* (2013.01); *B01J 37/0018* (2013.01); *B01J 37/036* (2013.01); *B01J 37/084* (2013.01); *B01J 37/10* (2013.01); *B01J 37/16* (2013.01); *B01J 37/18* (2013.01)

(56) References Cited

U.S. PATENT DOCUMENTS

| | | | |
|---|---|---|---|
| 4,956,331 A | 9/1990 | Tsurumi et al. | |
| 6,398,962 B1 | 6/2002 | Cabrera et al. | |
| 6,806,224 B2 | 10/2004 | Yoshihara et al. | |
| 6,911,192 B2 | 6/2005 | Nakanishi | |
| 7,157,402 B2 | 1/2007 | Yu et al. | |
| 7,374,599 B1 | 5/2008 | Shelnutt et al. | |
| 7,449,165 B2 | 11/2008 | Dai et al. | |
| 8,114,510 B2 | 2/2012 | Dai et al. | |
| 8,574,340 B2 | 11/2013 | Bakker et al. | |
| 9,233,366 B2 | 1/2016 | Bakker et al. | |
| 9,421,524 B2 | 8/2016 | Bakker et al. | |
| 9,669,388 B2 | 6/2017 | Bakker et al. | |
| 2002/0128478 A1 | 9/2002 | Krska et al. | |
| 2003/0181748 A1 | 9/2003 | Krauter et al. | |
| 2003/0187294 A1 | 10/2003 | Hagemeyer et al. | |
| 2005/0079374 A1 | 5/2005 | Asia | |
| 2005/0169829 A1 | 8/2005 | Dai et al. | |
| 2005/0176990 A1 | 8/2005 | Coleman et al. | |
| 2005/0214539 A1 | 9/2005 | Ying et al. | |
| 2006/0057051 A1 | 3/2006 | Dai et al. | |
| 2006/0229466 A1 | 10/2006 | Arhancet et al. | |
| 2006/0258875 A1 | 11/2006 | Reyes et al. | |
| 2009/0098442 A1 | 4/2009 | Pak et al. | |
| 2009/0269667 A1 | 10/2009 | Antonietti et al. | |
| 2010/0010513 A1 | 1/2010 | Yun et al. | |
| 2010/0140138 A1 | 6/2010 | Chaumonnot et al. | |
| 2010/0210876 A1 | 8/2010 | Ryu et al. | |
| 2010/0297389 A1* | 11/2010 | Dai .................. C04B 35/524 428/118 |
| 2011/0082024 A1 | 4/2011 | Liu et al. | |
| 2011/0223494 A1* | 9/2011 | Feaver ................ H01M 4/8615 429/405 |
| 2011/0251053 A1 | 10/2011 | Tucker et al. | |
| 2016/0089657 A1 | 3/2016 | Bakker et al. | |

OTHER PUBLICATIONS

Bachiller-Baezaa, et al., "Role of the residual chlorides in platinum and ruthenium catalysts for the hydrogenation of a, b-unsaturated aldehydes", Applied Catalysis A: General, 2000, 192(2): 289-297.
Baleizao, et al., "An oxime carbapalladacycle complex covalently anchored to silica as an active and reusable heterogeneous catalyst for Suzuki cross-coupling in water", Chemical Communications, 2003, 2003: 606-607.
Bandara, et al., "Comparison of the cation environment in polymer electrolytes based on poly(ethylene oxide) and transition-metal bromides", J. Chem. Soc. Faraday Trans. 90, 1994, 3549-3553.
Banhart et al., Metal Foams: Production and Stability, Adv. Eng. Mat., 2006, 8:781-794.
Barrett, et al., "The Determination of Pore Volume and Area Distributions in Porous Substances. I. Computations from Nitrogen Isotherms", J. Am. Chem. Soc. 1951, 73 (1), 373-380.
Bates et al., Block Copolymers—Designer Soft Materials, Physics Today, 1999, 52(2):32-38.
Beletskaya et al., The Heck Reaction as a Sharpening Stone of Palladium Catalysis, Chem. Rev., 2000, 100:3009-3066.
Belfield et al., Synthesis of New Two-Photon Absorbing Fluorene Derivatives via Cu-Mediated Ullmann Condensations, The Journal of Organic Chemistry,2000, 65(15):4475-4481.
Bell, "The impact of nanoscience on heterogeneous catalysis", Science, 2003, 299 (5613): 1688-1691.
Biener, et al., "Advanced carbon aerogels for energy applications", Energy Environ. Sci. 2011, 4, 656-667.
Binder et al., "Monte Carlo Methods for Estimating Interfacial Free Energies and Line Tensions", Journal of Statistical Physics, 2011, 144(3): 690-729.
Blanford et al., Gems of Chemistry and Physics: Macroporous Metal Oxides with 3D Order, Adv. Mat., 13:401-407 (2001) Brockner et al., Thermal decomposition of nickel nitrate hexahydrate, Ni(NO3)2 •6H2O, in comparison to Co(NO3)2 •6H2O and Ca(NO3)2•4H2O, Thermochim. Acta, 2007, 456:64-68.
Bohua Wu, et al., "Noble metal nanoparticles/carbon nanotubes nanohybrids: synthesis and applications", Nanotoday, 2011, 6(1): 75-90.
Boissiere, et al., "Aerosol route to functional nanostructured inorganic and hybrid porous materials", Adv. Mater. 23, 2011, 599.
Brockner et al., Thermal decomposition of nickel nitrate hexahydrate, Ni(NO3)2 •6H2O, in comparison to Co(NO3)2 •6H2O and Ca(NO3)2•4H2O, Thermochim. Acta, 2007, 456:64-68.
Brunauer, et al., "Adsorption of Gases in Multimolecular Layers", J. Am. Chem. Soc. 1938, 60 (2), 309-319.
Cahn, J. W., On Spinodal Decomposition. Acta. Met. 1961, 9 (9), 795-801.
Carn et al., Inorganic monoliths hierarchically textured via concentrated direct emulsion and micellar templates, J. Mater. Chem., 2004, 14:1370-1376.
Caruso et al., Cellulose Acetate Templates for Porous Inorganic Network Fabrication, Adv. Mat., 2000, 12(24):1921-1923.
Caruso et al., Silica Films with Bimodal Pore Structure Prepared by Using Membranes as Templates and Amphiphiles as Porogens, Adv. Functional Mat. 2002, 12(4):307-312.
Chekin, et al., "Preparation and electrochemical performance of grapheneePt black nanocomposite for electrochemical methanol oxidation", Journal of Solid State Electrochemistry, 2014, 18:893-898.
Chi, et al., "One-pot synthesis of ordered mesoporous silver nanoparticle/carbon composites for catalytic reduction of 4-nitrophenol", J. Colloid Interface Sci.2014, 423, 54-59.
Chuenchom, et al., "Recent progress in soft-templating of porous carbon materials", Soft Matter 2012, 8, 10801-10812.
Dai, et al., "Carbon nanomaterials for advanced energy conversion and storage", Small 2012, 8, 1130-1166.
Davis et al., Bacterial templating of ordered macrostructures in silica and silica-surfactant mesophases, Nature, 1997, 385:420-423.
Dorin, et al. "Hierarchically Porous Materials from Block Copolymers", Chem. Mater. 2014, 26, 339-347.
Drisko et al., "One-Pot Synthesis of Hierarchically Structured Ceramic Monoliths with Adjustable Porosity", Chem. Mater. 2010, 22, 4379-4385.
Erokhin, et al., "Nickel-supported metal-carbon nanocomposites: new catalysts of hydrogenation of phenylacetylene", Russ. J. Phys. Chem. A. 2014, 88, 12-16.
Estelle et al., Comparative study of the morphology and surface properties of nickel oxide prepared from different precursors, Solid State Ionics, 2003, 156:233-243.
Extended European Search Report issued in related European Application No. 13846718.8, dated Aug. 2, 2016.
Fang, et al., "Hierarchical Nanostructured Carbons with Meso-Macroporosity: Design, Characterization, and Applications", Acc. Chem. Res. 2013, 46 (7), 1397-1406.

(56) References Cited

OTHER PUBLICATIONS

Finol, et al., Additional effects of Pt and Nb on hierarchically porous titania in the catalytic removal of n-butanol, Catal. Today 2012, 192, 154-159.
Fuller et al., Degradation of explosives-related compounds using nickel catalysts, Chemosphere, 2007, 419-427.
Hakat, et al., "Catalytic activity of Ag/SiO2 and Ag/Co3O4 hierarchically porous monoliths for hydrogenation of dyes", Curr. Catal. 2014, 3, 286-295.
Hao, et al, "Lysine-assisted rapid synthesis of crack-free hierarchical carbon monoliths with a hexagonal array of mesopores", Carbon 2011, 49, 3762-3772.
Hao, et al., "Structurally Designed Synthesis of Mechanically Stable Poly(benzoxazine-co-resol)-Based Porous Carbon Monoliths and Their Application as High-Performance CO2 Capture Sorbents", J. Am. Chem. Soc. 2011, 133, 11378-11388.
Hillert, "Solid-Solution Model for Inhomogeneous Systems", Acta Material 1961, 9: 525-535.
Hu et al., Synthesis of Hierarchically Porous Carbon Monoliths with Highly Ordered Microstructure and Their Application in Rechargeable Lithium Batteries with High-Rate Capability, Adv. Functional Mater., 2007, 17(12):1873-1878.
Huang et al., "One-Step Hydrothermal Synthesis of Ordered Mesostructured Carbonaceous Monoliths with Hierarchical Porosities", Chem. Comm. 2008, 2641-2643.
Iikeun Lee, et al., "New nanostructured heterogeneous catalysts with increased selectivity and stability", Physical Chemistry Chemical Physics, 2011, 13: 2449-2456.
International Search Report and Written Opinion issued in Application No. PCT/US2012/066967, dated Mar. 19, 2013.
International Search Report and Written Opinion issued in Application No. PCT/US2013/065226 dated Dec. 18, 2013.
John H S. "Heterogeneous catalysis: some recent developments", Science, 1977, 195(4279): 641-646.
Joo, et al., "Ordered nanoporous arrays of carbon supporting high dispersions of platinum nanoparticles", Nature 2001, 412, 169-172.
Kido, et al., "Hierarchically porous nickel/ carbon composite monoliths prepared by sol-gel method from an ionic precursor", Micropor. Mesopor. Mater. 2013, 176, 64-70.
Köcher, et al., "Oxime-substituted NCN-pincer palladium and platinum halide polymers through non-covalent hydrogen bonding (NCN= [C6H2(CH2NMe2)2 2,6]−)". J. Organometal. Chem. 2008, 693, 2244-2250.
Konios et al., "Highly efficient organic photovoltaic devices utilizing work-function tuned graphene oxide derivatives as the anode and cathode charge extraction layers", Journal of Material Chemistry A, 2016, 4: 1612-1623.
Kotbagi, et al., "Facile one-pot synthesis and characterization of nickel supported on hierarchically porous carbon", Materials Research Bulletin, 2016, 73: 204-210.
Kotbagi, etal., "Novel one-pot synthesis of hierarchically porous Pd/C monoliths by a co-gelation method", MRS Commun. 2015, 5, 51-56.
Kyotani, "Control of pore structure in carbon", Carbon 2000, 38, 269-286.
Lee et al., "Gas sensors using hierarchical and hollow oxide nanostructures: overview", Sensors and Actuators B 140, 2009, p. 319-336.
Lepoutre et al., Detailed study of the pore-filling processes during nanocasting of mesoporous films using SnO2/SiO2 as a model system, Micro. Meso. Mater., 2009, 123:185-192.
Lepro, et al., "Efficient anchorage of Pt clusters on N-doped carbon nanotubes and their catalytic activity", Chemical Physics Letters, 2008, 463(1): 124-129.
Li et al., "X-ray diffraction patterns of graphite and turbostratic carbon" Carbon, 2007, 45: 1686-1695.
Li et al., Controlling the Shape and Alignment of Mesopores by Confinement in Colloidal Crystals: Designer Pathways to Silica Monoliths with Hierarchical Porosity, Langmuir, 2007, 23(7):3996-4004.
Li, et al., "One-pot synthesis of Pd nanoparticle catalysts supported on N-Doped carbon and application in the domino carbonylation", ACS Catal. 2013, 3, 839-845.
Li, et al., "Synthesis and applications of hierarchically porous catalysts", Chin. J. Catal. 2013, 34, 22-47.
Liang and S. Dai: Synthesis of mesoporous carbon materials via enhanced hydrogen-bonding interaction. J. Am. Chem. Soc. 2006,128, 5316.
Liang, Z. Li, S. Dai, Mesoporous carbon materials: synthesis and modification, Angew. Chem. Int. Ed. 47 (2008) 3696-3717.
Linares, et al., "Mesoporous materials for clean energy technologies", Chem. Soc. Rev. 2014, 43, 7681-7717.
Linares, S. Hartmann, A. Galarneau, P. Barbaro, Continuous partial hydrogenation reactions by Pd@unconventional bimodal porous titania monolith catalysts, ACS Catal. 2012, 2, 2194-2198.
Lipshutz, et al., "Biaryls via Suzuki Cross-Couplings Catalyzed by Nickel on Charcoal", Tetrahedron, 2000, 56(15): 2139-2144.
Liu, et al. "Nitrogen-doped hierarchically porous carbon spheres as efficient metal-free electrocatalysts for an oxygen reduction reaction", Journal of Power Sources, 2015, 283: 389-396.
Liu, et al., "Facile synthesis of ordered mesoporous carbons from F108/resorcinol-formaldehyde composites obtained in basic media", Chem. Commun. 2007, 757-759.
Llewellyn et al., Preparation of reactive nickel oxide by the controlled thermolysis of hexahydrated nickel nitrate, Solid State Ionics, 1997; 101-103(2):1293-1298.
Lordi V, Yao N and Wei J. Method for supporting platinum on single-walled carbon nanotubes for a selective hydrogenation catalyst. Chemistry of Materials, 2001, 13(3): 733-737.
Lu et al., Nanocasting: A Versatile Strategy for Creating Nanostructured Porous Materials; Royal Society of Chemistry: Cambridge, 2010; 13 pages.
Lu et al., Combined Surface and Volume Templating of Highly Porous Nanocast Carbon Monoliths, Adv. Functional Mater., 2005, 15:865-871.
Lu et al., Easy and flexible preparation of nanocasted carbon monoliths exhibiting a multimodal hierarchical porosity, Micro. Meso. Mater., 2004, 72:59-65.
Lu et al., Synthesis of Polyacrylonitrile-Based Ordered Mesoporous Carbon with Tunable Pore Structures, Chem. Mater., 2004, 16(1):100-103.
Maddox et al., Development of Ultrahigh Surface Area Porous Electrodes using Simultaneous and Sequential Meso- and Microstructuring Methods, In Mobile Energy, Materials Research Society: Boston, vol. 1127E, 2009, 6 pages.
Maekawa et al., Meso/Macroporous Inorganic Oxide Monoliths from Polymer Foams, Adv. Mat., 2003, 15(7-8):591-596.
Mansour, Spectroscopic and microscopic investigations of the thermal decomposition of nickel oxysalts. Part 2. Nickel nitrate hexahydrate, Thermochim. Acta, 1993, 228(15):173-189.
Miller, Separations in a monolith, Anal. Chem. 76 (2004) 99A-101A.
Nakanishi K. Pore Structure Control of Silica Gels Based on Phase Separation. Journal of Porous Materials, 1997, 4: 67-112.
Nakanishi, K., Hierarchically Porous Materials by Phase Separation: Monoliths. In Hierarchically Structured Porous Materials: From Nanoscience to Catalysis, Separation, Optic, Energy, and Life Science. Bao-Lian, S.; Sanchez, C.; Xiao-Yu, Y., Eds. Wiley-VCH Verlag: New York, 2012; vol. 1, pp. 241-267.
Navarro, E. Barea, J.M. Salas, N. Masciocchi, S. Galli, A. Sironi, C. O. Aniad, and J.B. Parra: Borderline microporous-ultramicroporous palladium(II) coordination polymer networks. Effect of pore functionalisation on gas adsorption properties. J. Mater. Chem. 2007, 17, 1939-1946.
Neimark, L.I. Kheifez, V.B. Fenelonov, Theory of preparation of supported catalysts, Ind. Eng. Chem. Prod. Res. Dev. 1981, 20, 439-450.
Nelmark et al., Theory of Preparation of Supported Catalysts, Ind. Eng. Chem. Prod. Res. Dev., 1981, 20:439-450.
Netto, R.C.G. Frem, and A.E. Mauro: Low-weight coordination polymers derived from the self-assembly reactions of Pd(II) pyrazolyl compounds and azide ion. Polyhedron 2005, 24, 1086-1092.

(56) References Cited

OTHER PUBLICATIONS

Nishihara et al., Ordered Macroporous Silica by Ice Templating, Chem. Mater., 2005, 17(3):683-689.

Numata, R. Takahashi, I. Yamada, K. Nakanishi, S. Sato, Sol-gel preparation of Ni/TiO2 catalysts with bimodal pore structures, Appl. Catal. A 383, 2010, 66-72.

Oberlin, A.; Bonnamy, S., Carbonization and Graphitization. In Graphite and Precursors, Delhaes, P., Ed. Gordon and Breach Science Publishers: Amsterdam, The Netherlands, 2001; pp. 199-220.

Ōya A, Ōtani S. Influences of particle size of metal on catalytic graphitization of non-graphitizing carbons. Carbon, 1981, 19(5): 391-400.

Oya, A.; Marsh, H., Phenomena of catalytic graphitization. J. Mater. Sci. 1982, 17, 309-322.

Oya, S. Yoshida, J. Alcaniz-Monge, and A. Linares-Solano: Formation of mesopores in phenolic resin-derived carbon fiber by catalytic activation using cobalt. Carbon 1995, 33, 1085-1090.

Ozaki, N. Endo, W. Ohizumi, K. Igarashi, M. Nakahara, A. Oya, S. Yoshida, and T. Iizuka: Novel preparation method for the production of mesoporous carbon fiber from a polymer blend. Carbon 1997, 35, 1031-1033.

Papon P, Leblon J nd Meijer P. H. E. Dynamics of Phase Transitions. In the Physics of Phase Transitions, 2006, 2: 37-77.

Parlett, K. Wilson, and A.F. Lee: Hierarchical porous materials: catalytic applications. Chem. Soc. Rev. 2013, 42, 3876-3893.

Paulik et al., Investigation of the Phase Diagram for the System Ni(NO3)2—H2O and Examination of the Decomposition of Ni(NO3)2 6H2O, Thermochim. Acta, 1987, 121:137-149.

Paulusse, J.P.J. Huijbers, and R.P. Sijbesma: Reversible, high molecular weight palladium and platinum coordination polymers based on phosphorus ligands. Macromolecules 2005, 38, 6290-6298.

Pratibha Gai, et al. Atomic-resolution environmental transmission electron microscopy for probing gase solid reactions in heterogeneous catalysis [J]. Material Science Society Bulletin, 2007, 32(12): 1044-1050.

Richard R Schrock. Multiple metal carbon bonds for catalytic metathesis reactions (Nobel Lecture). Angewandte Chemie International Edition, 2006, 45(23): 3748-3759.

Rongqing Y, Luwei C, Qiping L, et al. Platinum deposition on carbon nanotubes via chemical modification [J]. Chemistry of Materials, 1998, 10(3): 718-722.

Rui L, Xiqing W, Xiang Z, et al. Sulfonated ordered mesoporous carbon for catalytic preparation of biodiesel. Carbon, 2008, 46(13): 1664-1669.

Ryoo et al., Ordered Mesoporous Carbons, Adv. Mat., 2001, 13(9):677-681.

Sevilla, et al., "Fabrication of porous carbon monoliths with a graphitic framework", Carbon 56, 2013, 155-156.

Sevilla, et al., "Solid-phase synthesis of graphitic carbon nanostructures from iron and cobalt gluconates and their utilization as electrocatalyst supports", Phys. Chem. Chem. Phys. 2008, 10, 1433-1442.

Shen, et al. "In-situ catalytic conversion of tar using rice husk charsupported nickel-iron catalysts for biomass pyrolysis/gasification", Applied Catalysis B: Environmental, 2014, 152(1): 140-151.

Sholklapper et al., Synthesis of Dispersed and Contiguous Nanoparticles in Solid Oxide Fuel Cell Electrodes, Fuel Cells, 2008, 5:303-312.

Sietsma et al., How nitric oxide affects the decomposition of supported nickel nitrate to arrive at highly dispersed catalysts, J. Catal., 2008, 260:227-235.

Sietsma et al., Ordered Mesoporous Silica to Study the Preparation of Ni/SiO2 ex Nitrate Catalysts: Impregnation, Drying, and Thermal Treatments, Chem. Mater., 2008, 20(9):2921-2931.

Singh et al., "Water oxidation catalysts based on abundant 1st row transition metals", Coordination Chemistry Reviews, 2013, 257(17): 2419-2422.

Smått et al., Hierachically porous nanocrystalline cobalt oxide monoliths through nanocasting, Chem. Comm., 2004, 19:2188-2189.

Smått et al., Hierarchically Porous Metal Oxide Monoliths Prepared by the Nanocasting Route, Chem. Mater., 2006, 18:1443-1450.

Smått et al., Synthesis of micrometer sized mesoporous metal oxide spheres by nanocasting, Micro. Meso. Mater., 2008, 112:308-318.

Smått et al., Versatile Double-Templating Synthesis Route to Silica Monoliths Possessing a Multimodal Hierarchical Porosity, Chem. Mater., 2003, 15:2354-2361.

Smått, et al., "Formation of Hierarchically Porous Metal Oxide and Metal Monoliths by Nanocasting into Silica Monoliths", Adv. Eng. Mat. 2012, 14 (12), 1059-1073.

Stein et al., Morphological Control in Colloidal Crystal Templating of Inverse Opals, Hierarchical Structures, and Shaped Particles, Chem. Mater., 2008, 20(3):649-666.

Stein, Sphere templating methods for periodic porous solids, Micro. Meso. Mater., 2001, 44-45:227-239.

Stojmenovic, et al., "Incorporation of Pt, Ru and Pt—Ru nanoparticles into ordered mesoporous carbons for efficient oxygen reduction reaction in alkaline media", Electrochim. Acta 2015, 153, 130-139.

Sturm et al, Tin Dioxide Microspheres as a Promising Material for Phosphopeptide Enrichment Prior to Liquid Chromatography-(Tandem) Mass Spectrometry Analysis, Adv. Functional Mater., 2008, 18(16):2381-2389.

Stylianakis, "Efficient ternary organic photovoltaics incorporating a graphene-based porphyrin molecule as a universal electron cascade material", Nanoscale, 2015, 7: 17827-17835.

Sun et al., "A general chelate-assisted Co-assembly to metallic nanoparticles-incorporated ordered mesoporous carbon catalysts for fischer-tropsch synthesis", J. Am. Chem. Soc. 2012, 134, 17653-17660.

Sun et al., Container Effect in Nanocasting Synthesis of Mesoporous Metal Oxides, J. Am. Chem. Soc., 2011, 133(37):14542-14545.

Suzuki et al., Synthesis of mesoporous silica foams with hierarchical trimodal pore structures, J. Mater. Chem., 2003, 13:1812-1816.

Taguchi et al. "Carbon monoliths possessing a hierarchical, fully interconnected porosity." Advanced Materials, 2003, 15(14), 1209-1211.

Tappan et al., Nanoporous Metal Foams, Angew. Chem. Int. Ed., 2010, 49:4544-4565.

Tappan et al., Ultralow-Density Nanostructured Metal Foams: Combustion Synthesis, Morphology, and Composition, J. Am. Chem. Soc., 2006,128(20):6589-6594.

Tidahy, et al., "New Pd/hierarchical macro-mesoporous ZrO2, TiO2 and ZrO2—TiO2 catalysts for VOCs total oxidation", Appl. Catal. A: Gen. 310 (2006) 61-69.

Tundo, et al., "Modifier effects on Pt/C, Pd/C, and Raney-Ni catalysts in multiphase catalytic hydrogenation systems", Journal of Molecular Catalysis A: Chemical, 2003, 204-205: 747-754.

Unger, et al., "Particle packed columns and monolithic columns in high-performance liquid chromatography-comparison and critical appraisal", J. Chromatogr. A, 1184, 2008, 393-415.

Upadhyay, et al., "Enhanced photoelectrochemical response of reduced-graphene oxide/Zn1—xAgxO nanocomposite in visible-light region", International Journal of Hydrogen Energy, 2014, 39: 11027-11034.

Valkenberg, et al., "Immobilisation of ionic liquids on solid supports", Green Chemisty, 2002, 4: 88-93.

Vargas-Florencia et al., Inorganic Salt Hydrates as Cryoporometric Probe Materials to Obtain Pore Size Distribution, J. Phys Chem. B, 2006, 110:3867-3870.

Walsh et al., Dextran templating for the synthesis of metallic and metal oxide sponges, Nat. Mat., 2003, 2:386-390.

Wang and S. Dai: A simple method to ordered mesoporous carbons containing nickel nanoparticles. Adsorption 2009, 15, 138-144.

Wankhade, et al. "Removal of organic pollutant from water by heterogeneous photocatalysis: a review". Research Journal of Chemistry and Environment, 2013, 17(1):84-94.

Wei, Y. Gong, T. Xiong, P. Zhang, H. Li, Y. Wang, Highly efficient and chemoselective hydrogenation of a,b-unsaturated carbonyls over Pd/N-doped hierarchically porous carbon, Catal. Sci. Technol. 2015, 5, 397-404.

Xia, Z. Yang, and R. Mokaya: Templated nanoscale porous carbons. Nanoscale 2010, 2, 639.

(56) References Cited

OTHER PUBLICATIONS

Xiao, et al., "Review on the properties of nano-/microstructures in the catalyst layer of PEMFC", Journal of Fuel Cell Science and Technology, 2011, 8(3): 1-13.

Yacou et al., "Catalytic membrane materials with a hierarchical porosity and their performance in total oxidation of propene", Catal. Today, 2010, 156, 216-222.

Yagci, et al., "Recent advancement on polybenzoxazine—a newly developed high performance thermoset", J. Polym. Sci. Part A: Polym. Chem. 2009, 47, 5565-5576.

Yan et al., A Chemical Synthesis of Periodic Macroporous NiO and Metallic Ni, Adv. Mat., 1999, 11(12):1003-1006.

Yang, et al., "Self-formation phenomenon to hierarchically structured porous materials: design, synthesis, formation mechanism and applications", Chem. Commun. 47, 2011, 2763.

Yang, et al., Synthesis of replica mesostructures by the nanocasting strategy, J. Mater. Chem., 2005, 15:1217-1231.

Yang, Y. Li, A. Lemaire, J.-G. Yu, and B.-L. Su: Hierarchically structured functional materials: synthesis strategies for multimodal porous networks. Pure Appl. Chem. 2009, 81, 2265.

Yang, Y. Ren, C. Sun, S. Hao, Facile route fabrication of nickel based mesoporous carbons with high catalytic performance towards 4-nitrophenol reduction, Green Chem. 16 (2014) 2273-2280.

Yuan and B.-L. Su: Insights into hierarchically meso-macroporous structured materials. J. Mater. Chem. 16, 663 (2006).

Yue et al., Mesoporous metal oxides templated by FDU-12 using a new convenient method, Studies Surf. Sci. Catal., 2007, 170:1755-1762.

Yue et al., Synthesis of Porous Single Crystals of Metal Oxides via a Solid-Liquid Route, Chem. Mater., 2007, 19(9):2359-2363.

Zhai, Y. Dou, X. Liu, S.S. Park, C.-S. Ha, D. Zhao, Soft-template synthesis of ordered mesoporous carbon/nanoparticle nickel composites with a high surface area, Carbon 49, 2011, 545-555.

Zhang, et al., "A facile aqueous route to synthesize highly ordered mesoporous polymers and carbon frameworks with la3d bicontinuous cubic structure", J. Am. Chem. Soc. 2005, 127, 13508-13509.

Zhang, et al., "A facile route for preparing a mesoporous palladium coordination polymer as a recyclable heterogeneous catalyst", Dalton Trans. 2012, 41, 4692-4698.

Zhang, et al., "Functional porous organic polymers for heterogeneous" Chemical Society Reviews, 2012, 41: 2083-2094.

Zhang, et al., "Magnetically recoverable Ni/C catalysts with hierarchical structure and high-stability for selective hydrogenation of nitroarenes", Phys. Chem. Chem. Phys. 2015, 17, 145-150.

Zhao et al., Multiphase Assembly of Mesoporous-Macroporous Membranes, Chem. Mater., 1999, 11(5):1174-1178.

Zhen-Bo, et al., "Effect of Ni on PtRu/C catalyst performance for ethanol electrooxidation in acidic medium", Journal of Physical Chemistry C, 2008, 112(16): 6582-6587.

Zhu et al. "Hierarchical porous/hollow tin oxide nanostructures mediated by polypeptide: Surface modification, characterization, formation mechanism and gas-sensing properties", Nanotechnology 17, 2006, p. 5960-5969.

Zhu, X.-W. Wei, S. Jiang, A facile route to carbon-coated nickel-based metal nanoparticles, J. Mater. Chem. 2007, 17, 2301-2306.

NETL, Existing Plants Emissions and Capture Setting CO2 Program Goals, DOE/NETL-2009/1366, Res & Dev. Goals for CO2 Capture Tech, 2011, 35 pages.

NETL, Carbon Sequestration Technology Roadmap and Program Plan 2007, 48 pages.

\* cited by examiner

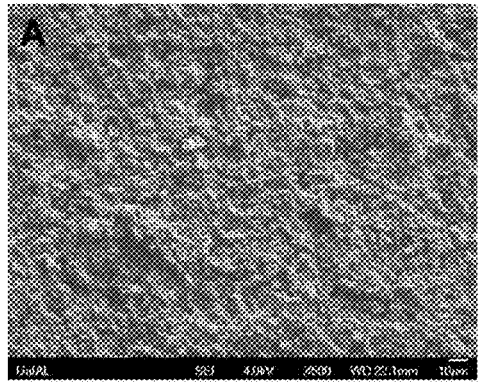
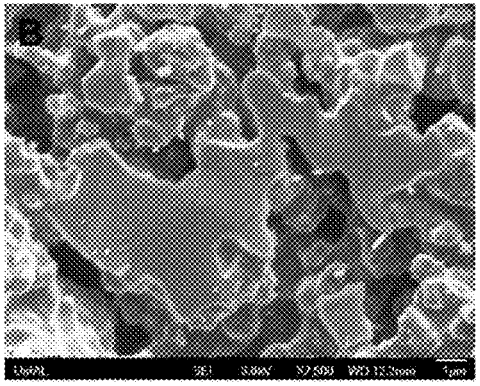
FIG. 16A　　　　　　　　FIG. 16B
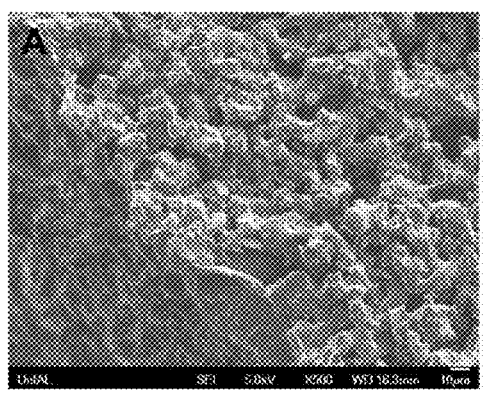
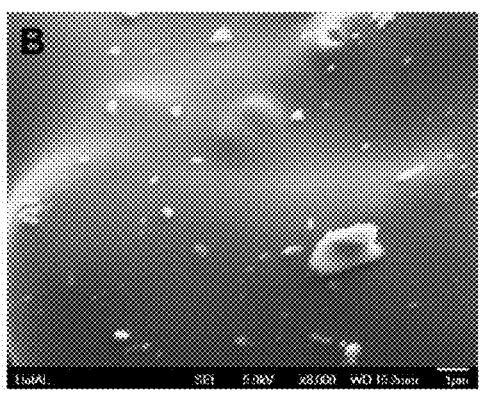
FIG. 17A　　　　　　　　FIG. 17B

SYNTHESIS OF HIERARCHICALLY POROUS MONOLITHS BY A CO-GELATION METHOD

CROSS REFERENCE TO RELATED APPLICATIONS

This application claims the benefit of priority to U.S. Provisional Application No. 62/303,995, filed Mar. 4, 2016, which is incorporated by reference herein in its entirety.

BACKGROUND

Catalysis is an important interdisciplinary technology in the chemical industry. Of all chemical and pharmaceutical products produced today, more than 85% of products are manufactured by catalytic processes. The application of heterogeneous catalysis is highly desirable in order to achieve green chemistry goals by minimizing separations. The activity of heterogeneous catalysts depends on various factors, such as surface area, pore size of the support, and particle size of the active metals on the support. Hierarchically porous catalysts have connecting pores with multiple length scales (Yuan, Z.-Y., et al., Su: Insights into hierarchically meso-macroporous structured materials. *J. Mater. Chem.* 2006, 16, 663; Yang, X.-Y. et al., Hierarchically structured functional materials: synthesis strategies for multimodal porous networks. *Pure Appl. Chem.* 2009, 81, 2265; Boissiere, C., et al., Aerosol route to functional nanostructured inorganic and hybrid porous materials. *Adv. Mater.* 2011, 23, 599; X.-Y. Yang, et al., Self-formation phenomenon to hierarchically structured porous materials: design, synthesis, formation mechanism and applications. *Chem. Commun.* 2011, 47, 2763). This provides superior mass diffusion that can in turn increase the accessibility of the fluids (reactants and products) during organic transformations. There is increasing interest in development of these materials, as the ability to separately control structure at the nanometer and micrometer length scales (Parlett, C. M. A., et al., Hierarchical porous materials: catalytic applications. *Chem. Soc. Rev.* 2013, 42, 3876) promises improvements in catalytic performance by tuning the structure of the catalyst.

Porous carbon is widely used in heterogeneous catalysis because of high surface area and large pore volume coupled with good chemical, thermal, and mechanical stability. Meso-macroporous carbons have been studied in important applications, such as adsorption, gas storage, separations, and electrochemistry as well as catalysis. Porous carbons are widely used as supports for catalytically active metals such as palladium (Pd), platinum (Pt), nickel (Ni), etc. Various approaches have been reported for the synthesis of hierarchically porous carbon support including catalytic activation of carbon precursors (A. Oya, et al., Formation of mesopores in phenolic resin-derived carbon fiber by catalytic activation using cobalt. *Carbon* 33, 1085 (1995); T. Kyotani, Control of pore structure in carbon. *Carbon* 38, 269 (2000)), carbonization of polymeric blends (J. Ozaki, et al., Novel preparation method for the production of mesoporous carbon fiber from a polymer blend. *Carbon* 35, 1031 (1997)), use of basic catalysts such as lysine (G.-P. Hao, et al., Lysine-assisted rapid synthesis of crack-free hierarchical carbon monoliths with a hexagonal array of mesopores. *Carbon* 49, 3762 (2011)), and the carbonization of resorcinol-formaldehyde or phenol-formaldehyde aerogels (J. Biener, et al., Advanced carbon aerogels for energy applications. *Energy Environ. Sci.* 4, 656 (2011)).

Recent reports describe the fine tuning of the textural properties of the carbon including meso-macroporosity, ordered-disordered, surface area, and stability by varying the composition of the surfactant template and carbon precursor or hard (C. Liang, Z. Li, and S. Dai: Mesoporous carbon materials: synthesis and modification. *Angew. Chem.—Int. Ed. Engl.* 20, 3696 (2008); Y. Xia, et al., Templated nanoscale porous carbons. *Nanoscale* 2, 639 (2010)), and soft-templating methods (L. Chuenchom, et al., Recent progress in soft templating of porous carbon materials. *Soft Matter* 8, 10801 (2012)). The use of $SiO_2$ monoliths as a hard template for replication to synthesize mesoporous carbon monoliths has been reported (A.-H. Lu, J et al., Easy and flexible preparation of nanocasted carbon monoliths exhibiting a multimodal hierarchical porosity. *Micropor. Mesopor. Mater.* 72, 59 (2004)). Various block-copolymers and the tri-block copolymers of the Pluronic family have been applied for the direct synthesis of ordered porous carbon (C. Liang and S. Dai: Synthesis of mesoporous carbon materials via enhanced hydrogen-bonding interaction. *J. Am. Chem. Soc.* 128, 5316 (2006); F. Zhang, et al., A facile aqueous route to synthesize highly ordered mesoporous polymers and carbon frameworks with Ia3d bicontinuous cubic structure. *J. Am. Chem. Soc.* 127, 13508 (2005); C. Liu, et al., Facile synthesis of ordered mesoporous carbons from F108/resorcinol-formaldehyde composites obtained in basic media. *Chem. Commun.* 757 (2007)). The incorporation of active-metal species onto the porous carbon support is typically carried out by impregnation or infiltration techniques. However, these processes can be time consuming and increase the cost of the final product. What are thus needed are more efficient techniques for synthesizing hierarchically porous carbon monoliths containing active metal species, which can be used in a variety or catalytic or separation processes. The compositions and methods disclosed herein address these and other needs.

SUMMARY

Disclosed are compositions and methods for making and using the disclosed compositions. In a further aspect, disclosed are methods of synthesizing a hierarchically porous carbon monolith by combining a second polymer precursor with a solution comprising a first polymer precursor, a surfactant, and a metal complex, wherein the metal complex has a stability constant whose base 10 logarithm is at least 0; polymerizing the first and second polymer precursors, thereby producing a polymer monolith; and then carbonizing and reducing the polymer monolith with a reducing agent, thereby producing the hierarchically porous carbon monolith. Monoliths prepared by the disclosed methods and methods of using these monoliths in catalytic reactions are also disclosed.

Additional advantages of the disclosed subject matter will be set forth in part in the description that follows and the Figures, and in part will be obvious from the description, or can be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying figures, which are incorporated in and constitute a part of this specification, illustrate several aspects described below.

FIGS. 16A and 16B are SEM micrographs of 1Cr/CB at different magnifications using secondary electron imaging.

FIGS. 17A and 17B are SEM micrographs of 1Cr/CC at different magnifications using secondary electron imaging.

DETAILED DESCRIPTION

Figure 1:
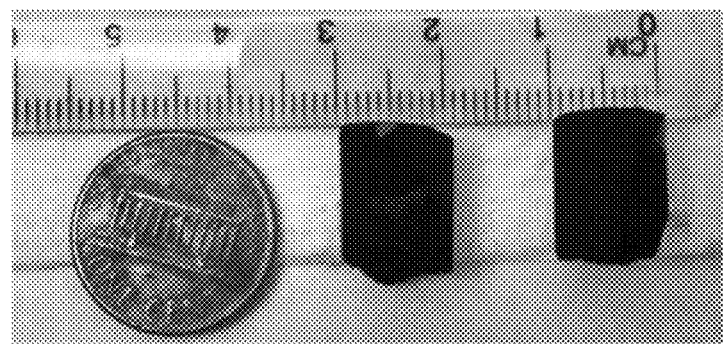
FIG. 1 is a photograph of 1 and 5 wt % Pd/C (from left). An American one cent coin is shown to indicate scale.

The materials, compounds, compositions, kits and methods described herein may be understood more readily by reference to the following detailed description of specific aspects of the disclosed subject matter and the Examples and Figures included therein.

Before the present materials, compounds, compositions, kits and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms that shall be defined to have the following meanings:

It must be noted that as used herein and in the appended claims, the singular forms "a," "an," and "the" include plural referents unless the context clearly dictates otherwise. Thus, for example, reference to "a polymer" includes a plurality of such polymers, reference to "the support" is a reference to one or more supports and equivalents thereof known to those skilled in the art, and so forth.

"Phase," as used herein, generally refers to a region of material having a substantially uniform composition which is a distinct and physically separate portion of a heterogeneous system. The term "phase" does not imply that the material making up a phase is a chemically pure substance, but merely that physical properties of the material making up the phase are essentially uniform throughout the material, and that these physical properties differ significantly from the physical properties of another phase within the material. Examples of physical properties include density, index of refraction, and chemical composition.

"Continuous," as used herein, generally refers to a phase such that all points within the phase are directly connected, so that for any two points within a continuous phase, there exists a path which connects the two points without leaving the phase. A "phase" in this context can refer to, for example, a pore or network of pores, a void, or a wall formed from a solid layer of carbon.

"Bicontinuous," as used herein, generally refers to a material containing two separate continuous phases such that each phase is continuous, and in which the two phases are interpenetrating, such that it is impossible to separate the two structures without tearing one of the structures. Another example of a system with this property is the gyroid phase of block copolymers. See, for example, Bates, "Block Copolymers Designer Soft Materials", Physics Today February 32, 1999, which is incorporated by reference herein for its description of bicontinuous materials.

"Tortuous," as used herein, generally refers to a phase that is characterized by numerous short straight line distances, such that moving within the phase requires continual changes in direction.

By "hollow" is meant when two continuous (void) network phases completely separated by a third continuous phase that prevents any direct contact between the two continuous void network phases. In a large body, material cannot travel from one continuous void phase to the other continuous void phase without passing through the third continuous separating phase.

"Hierarchical pores," as used herein, generally refer to pores that span two or more different length scales. Thus, "hierarchically porous materials" are materials which contain pores that span two or more length scales. In some embodiments, there can be a distribution of pore diameters at each length scale, where often the distributions of pore diameters are sufficiently narrow that there is little or no overlap between the pore size distributions. In some cases, there are some pore sizes for which few or no pores are present in such a hierarchically porous material. In most cases, the hierarchically porous materials have mesopores and macropores (and optionally micropores).

"Constant diameter," as used herein, generally refers to a circumstance in which the smallest distance across a continuous phase is relatively constant (e.g., less than one standard deviation, or less than two standard deviations).

"Monolith," as used herein, generally refers to a macroscopic, single piece of material typically with one or more dimensions (length, width, and/or height) exceeding about 0.1 mm. A monolith is distinguished from a particle, in that particles possess dimensions that are less than that for a monolith.

"Particle," as used herein, generally refers to a discrete unit of material, such as a grain, bead, or other particulate form, typically with dimensions (length, width, and/or hight) ranging from 1 µm to 100 µm. Particles may have any shape (e.g., spherical, ovoid, or cubic).

"Nanoparticle", as used herein, generally refers to a particle of any shape having an average particle size from about 1 nm up to, but not including, about 1 µm. In certain embodiments, nanoparticles have an average particle size from about 2 nm to about 50 nm. The size of nanoparticles can be experimentally determined using a variety of methods known in the art, including electron microscopy.

"Mean particle size" or "average particle size", are used interchangeably herein, and generally refer to the statistical mean particle size (diameter) of the nanoparticles in a population of nanoparticles. The diameter of an essentially spherical nanoparticle may refer to the physical or hydrodynamic diameter. The diameter of a non-spherical nanoparticle may refer preferentially to the hydrodynamic diameter. As used herein, the diameter of a non-spherical nanoparticle may refer to the largest linear distance between two points on the surface of the nanoparticle. Mean particle size can be measured using methods known in the art, such as evaluation by scanning electron microscopy.

"Monodisperse" and "homogeneous size distribution" are used interchangeably herein, and generally describe a population of nanoparticles where all of the nanoparticles are the same or nearly the same size. As used herein, a monodisperse distribution refers to particle distributions in which 90% of the distribution lies within 25% of the median particle size (e.g., within 20% of the median particle size, within 15% of the median particle size, within 10% of the median particle size, or within 5% of the median particle size).

The terms "metal complex" or "metal salt" are used interchangeable herein and mean a chemical entity having one or more metal atoms or ions bound to one or more ligands. In most cases herein there is a central metal atom or ion bound to multiple ligands. The metal complexes can be positive charged, negative charged or neutral.

Reference will now be made in detail to specific aspects of the disclosed materials, compounds, compositions, articles, and methods, examples of which are illustrated in the accompanying Examples and Figures.

Methods

Disclosed herein is a one-pot, facile approach for the synthesis of metal supported on a hierarchically porous carbon monolith using a co-gelation method in which a metal complex is included with the polymer precursors. The macropores in the carbon are produced by spinodal decomposition, and mesopores are produced by the addition of a surfactant, such as the triblock non-ionic surfactant F127. This type of direct synthesis has previously been reported for the one pot synthesis of various metals and metal oxides supported on mesoporous carbon powders (Z. Sun, et al., A general chelate-assisted Co-assembly to metallic nanoparticles-incorporated ordered mesoporous carbon catalysts for Fischer-Tropsch synthesis. *J. Am. Chem. Soc.* 134, 17653 (2012); Z. Li, et al. One-pot synthesis of Pd nanoparticle catalysts supported on N-Doped carbon and application in the domino carbonylation. *ACS Catal.* 3, 839 (2013); X. Wang et al., A simple method to ordered mesoporous carbons containing nickel nanoparticles. Adsorption 15, 138 (2009)), and thin films (Y. Chi, et al., One-pot synthesis of ordered mesoporous silver nanoparticle/carbon composites for catalytic reduction of 4-nitrophenol. *J. Colloid Interface Sci.* 423, 54 (2014); M. Stojmenovic, et al., Incorporation of Pt, Ru and Pt—Ru nanoparticles into ordered mesoporous carbons for efficient oxygen reduction reaction in alkaline media. *Electrochim. Acta* 153, 130 (2015)), but this is the first report of the application to monolithic supports. The aim of the work is to achieve hierarchically porous, stable metal on carbon catalysts as monoliths in a single step synthesis, thereby making the synthesis more material and energy efficient, while retaining the catalytic properties needed for use in a fixed bed reactor or monolithic microreactor.

Hierarchically porous materials have garnered considerable attention in recent times due to the high surface area accessible through interconnecting pores at multiple length scales, which gives superior mass diffusion (X. Li, et al., Synthesis and applications of hierarchically porous catalysts, *Chin. J. Catal.* (2013) 22-47). Owing to these unique properties this class of materials has potential applications in the fields of chromatography (S. Miller, Separations in a monolith, *Anal. Chem.* 76 (2004) 99A-101A; K. K. Unger, et al., Schulte, Particle packed columns and monolithic columns in high-performance liquid chromatography-comparison and critical appraisal, *J. Chromatogr. A* 1184 (2008) 393-415), medicine, electronics, optical switches, sensors, nanoelectronic devices, and heterogeneous catalysis (N. Linares, et al., Continuous partial hydrogenation reactions by Pd@unconventional bimodal porous titania monolith catalysts, *ACS Catal.* 2 (2012) 2194-2198; M. Numata, et al., Sol-gel preparation of Ni/$TiO_2$ catalysts with bimodal pore structures, *Appl. Catal. A* 383 (2010) 66-72). Hierarchically porous materials are especially of interest in heterogeneous catalysis where better dispersion of metal particles is expected. Hierarchically porous materials as support for different active metals, including palladium (Pd) (H. L. Tidahy, et al., New Pd/hierarchical macro-mesoporous $ZrO_2$, $TiO_2$ and $ZrO_2$—$TiO_2$ catalysts for VOCs total oxidation, *Appl. Catal. A: Gen.* 310 (2006) 61-69; T. V. Kotbagi, et al., Novel one-pot synthesis of hierarchically porous Pd/C monoliths by a co-gelation method, *MRS Commun.* 5 (2015) 51-56), platinum (Pt), niobium (Nb) (M. F. Finol, et al., Additional effects of Pt and Nb on hierarchically porous titania in the catalytic removal of n-butanol, *Catal. Today* 192 (2012) 154-159), nickel (Ni) (Y. Kido, et al., Hierarchically porous nickel/carbon composite monoliths prepared by sol-gel method from an ionic precursor, *Micropor. Mesopor. Mater.* 176 (2013) 64-70), silver (Ag) (Y. Hakat, et al., Catalytic activity of Ag/$SiO_2$ and Ag/$Co_3O_4$ hierarchically porous monoliths for hydrogenation of dyes, *Curr. Catal.* 3 (2014) 286-295), have been of interest to catalyst scientists. In the reported literature these metals have been supported on various porous supports including $SiO_2$ (Yacou, et al., Catalytic membrane materials with a hierarchical porosity and their performance in total oxidation of propene, *Catal. Today* 156 (2010) 216-222), $TiO_2$ (N. Linares, et al., Continuous partial hydrogenation reactions by Pd@unconventional bimodal porous titania monolith catalysts, *ACS Catal.* 2 (2012) 2194-2198), $ZrO_2$ (H. L. Tidahy, et al., New Pd/hierarchical macro-mesoporous $ZrO_2$, $TiO_2$ and $ZrO_2$—$TiO_2$ catalysts for VOCs total oxidation, *Appl. Catal. A: Gen.* 310 (2006) 61-69) and carbon (Z. Wei, et al., Highly efficient and chemoselective hydrogenation of α,β-unsaturated carbonyls over Pd/N-doped hierarchically porous carbon, *Catal. Sci. Technol.* 5 (2015) 397-404). Hierarchically porous carbon (HPC) has been used in applications including catalysis, adsorption, drug delivery, and energy storage as well as conversion (S. H. Joo, et al., Ordered nanoporous arrays of carbon supporting high dispersions of platinum nanoparticles, *Nature* 412 (2001) 169-172; C. Liang, et al., Mesoporous carbon materials: synthesis and modification, *Angew. Chem. Int. Ed.* 47 (2008) 3696-3717; L. M. Dai, et al., Carbon nanomaterials for advanced energy conversion and storage, *Small* 8 (2012) 1130-1166). Carbon is already widely used as a support for Pt group metals, which are the premium catalysts for many organic transformations such as hydrogenations, reductions, and dehalogenations. Pd supported on carbon is also used as a source of Pd for C—C couplings and C-heteroatom couplings. Because of the high prices of Pt and Pd, Ni is widely used for these reactions, when the activity is sufficiently high (Y. Yang, et al., Facile route fabrication of nickel based mesoporous carbons with high catalytic performance towards 4-nitrophenol reduction, *Green Chem.* 16 (2014) 2273-2280; A. V. Erokhin, et al., Nickel-supported metal-carbon nanocomposites: new catalysts of hydrogenation of phenylacetylene, *Russ. J. Phys. Chem. A* 88 (2014) 12-16). Various methods have been reported for the synthesis of Ni supported on carbon (Ni/C), for e.g., soft-template synthesis, (Y. Zhai, et al., Soft-template synthesis of ordered mesoporous carbon/nanoparticle nickel composites with a high surface area, *Carbon* 49 (2011) 545-555), a one-step hydrothermal method (P. Zhang, et al., Magnetically recoverable Ni/C catalysts with hierarchical structure and high-stability for selective hydrogenation of nitroarenes, *Phys. Chem. Chem. Phys.* 17 (2015) 145-150), a solution phase chemical reduction method (G.-X. Zhu, et al., A facile route to carbon-coated nickel-based metal nanoparticles, *J. Mater. Chem.* 17 (2007) 2301-2306), and a sol-gel method (Y. Kido, et al., Hierarchically porous nickel/carbon composite monoliths prepared by sol-gel method from an ionic precursor, *Micropor. Mesopor. Mater.* 176 (2013) 64-70).

There are a number of published methods for making hierarchically porous materials. There are also a number of methods known in the art for forming metal nanoparticles on the surface of pores. These include various infiltration, impregnation and vapor deposition methods that are applicable to making materials consisting of nanoparticles on hierarchically porous supports (Ertl, G.; et al., *Handbook of Heterogeneous Catalysis.* Wiley-VCH: Wienheim, Germany, 2008). There are also methods based on "nanocasting" which can produce metal nanoparticles that are completely or partially embedded in the walls of macropores and mesopores (Lu, A.-H., et al., Nanocasting: A Versatile Strategy for Creating Nanostructured Porous Materials. *Royal Society of Chemistry*: Cambridge, 2010, 11, 265; Smått, J.-H., et al., Formation of Hierarchically Porous Metal Oxide and Metal Monoliths by Nanocasting into Silica Monoliths. *Adv. Eng. Mat.* 2012, 14 (12), 1059-1073; Linares, N., et al., Mesoporous materials for clean energy technologies. *Chem. Soc. Rev.* 2014, 43, 7681-7717). These processes involve a number of steps. A more direct method in which a material comprising a hierarchically porous support and nanoparticles formed in a single step can be significantly cheaper.

Provided are methods of making such nanoparticle containing hierarchically porous materials from a mixture of precursors including (1) polymer precursors, (2) a metal complex, (3) one or more surfactants to act as structure directing agents, and in an embodiment (4) an alkyl diamine, which can act as cross-linking agent and polymerization catalyst. This mixture can be dissolved in water, ethanol or water/ethanol mixtures. As the polymerization progresses the polymer formed becomes insoluble, which can induce phase separation. In another embodiment phase separation can be on the 0.5 micrometer to 50 micrometer scale giving rise to a green body which has a continuous network of macropores of this scale throughout the green body. This type of phase separation can be referred to as spinodal decomposition (Cahn, J. W., On Spinodal Decomposition. *Acta. Met.* 1961, 9 (9), 795-801; Hillert, M., A Solid-Solution Model for Inhomogeneous Systems. *Acta. Met.* 1961, 9, 525-535). Heating under nitrogen or other inert gas first drives off the solvent, and completes the curing/polymerization of the green body. Heating to higher temperatures (200° C.-350° C.) can result in evaporation of much of the surfactant that gives rise to structures on the 2-20 nm scale. Heating to higher temperatures (>450° C.) can result in the polymeric material formed in the earlier steps converting to carbon, while heating to still higher temperatures (500° C. to >1200° C.) can result in increasing conversion of the amorphous carbon formed at lower temperatures to more ordered, graphitic forms of carbon. Heating is done under an inert atmosphere. In specific examples, the polymeric material can be heated to 500° C., 550° C., 600° C., 650° C., 700° C., or 800° C. Additional heating from 800° C. to 1100° C., e.g., 850° C., 900° C., 1000° C., or 1100° C. can also be performed. During the heating process the metal ions from the metal salt precursors can be reduced to metal atoms, which can become sufficiently mobile at higher temperatures to form metal nanoparticles. These nanoparticles can be incorporated into the carbon of the monolith, or can be formed at, or move to, the internal surfaces of the porous carbon monolith. The metal ions can be reduced by carbon being formed during the heating process, or it can be reduced by gas species being formed by the heating process. Reducing agents that can be used include alcohol, polyol, carboxylic acid, aldehyde, hydrazine, hydride, and borane. A reducing gas such as hydrogen or carbon monoxide that is added during the heating can assist in the reduction of the metal ions to metal. Some metal nanoparticles, particularly those of iron, nickel and cobalt are believed to assist in converting amorphous carbon to graphite.

One example of the synthesis of a monolith is described by Hao et al. (Structurally Designed Synthesis of Mechanically Stable Poly(benzoxazine-co-resol)-Based Porous Carbon Monoliths and Their Application as High-Performance $CO_2$ Capture Sorbents. *J. Am. Chem. Soc.* 2011, 133, 11378-11388): dissolving in a solution of 50% by volume ethanol to 50% by volume water: resorcinol as a polymer precursor, Pluronic F127 as a surfactant and structure directing agent, 1,6-diamino-hexane as a polymerization catalyst and auxiliary structure directing agent. To this solution is added formalin, which forms a polymer with the 1,6-diamino-hexane and the resorcinol. This polymer as discussed herein can undergo spinodal decomposition to give a monolith that comprises a network of macropores where the walls of the macropores comprise mesopores. Addition of a metal salt to this solution, prior to the addition of the formalin, can lead to incorporation of metal ions in the polymer that can be reduced to metal nanoparticles when the polymer body is heated sufficiently. In some examples, the metal salts can be acetates, but other salts such as metal nitrates, metal citrates, metal oxalates, and metal formats, can also be used. The metal can also be in the form of a complex such as tetraamino palladium dichloride, nickel acetate, or chromium(III) acetate.

The first polymer precursor can be selected from the group consisting of resorcinol, phenol, phloroglucinol, 1,3-dichlorobenzene, 1,3-dibromobenzene, 1,3-ditosylatebenzene, 1,3-diaminobenzene, 1,3-dinitrobenzene, and 1,3-diiodobenzene.

The second polymer precursor can be selected from the group consisting of formaldehyde, formalin, acetaldehyde, propionaldehyde, butyraldehyde, acetophenone, glyoxal, paraformaldehyde, s-trioxane, methyal, and dimethoxymethane, and benzaldehyde.

The metal salts can comprise, for example, a transition metal, a lanthanide metal, or combinations thereof. In some embodiments, an additional metal, such as an alkaline metal, an alkaline earth metal, or a combination thereof, can also be present. In some cases, the metal salt comprises a metal selected from the group consisting of Ti, V, Cr, Mn, Fe, Co, Ni, Cu, Zr, Nb, Mo, Tc, Ru, Rh, Pd, Ag, Hf, Ta, W, Re, Os, Ir, Pt, Au, La, Ce, Pr, Nd, Pm, Sm, Eu, Gd, Tb, Dy, Ho, Er, Tm, Yb, and combinations thereof. In preferred examples, the metal is Pd, Pt, Ni, and Cr.

The metal should be bound to a ligand that strongly binds the metal. The binding strength of the ligand to the metal is reflected in the stability constant. The stability constant of a metal complex can be calculated as follows: $K=[ML]/[M][L]$, where K is the stability constant (expressed as a base 10 logarithm, measured in water at 25° C.); M is the amount of metal ion such as $Cr^{3+}$ ion, and L is the amount of a ligand such as acetate. The total concentration of metal CM can be computed with specialized computation programs. The basic equation $CM=[M]+[ML]$ with $[ML]=K [M] [L]$ becomes $CM=[M] (1+K [L])$; hence $[M]=CM/(1+K [L])$ shows that the concentration of M depends on the stability constant of the complex and free concentration of the ligand which is dependent upon corresponding pK and pH values. In specific examples, the disclosed metal complexes have a stability constant of at least 0, more specifically, from 0 to 50, from 0 to 30, from 0 to 20, from 0 to 10, from 0 to 5, from 0 to 3, from 10 to 50, from 10 to 40, from 10 to 30, from 10 to 20, from 20 to 50, from 20 to 40, from 20 to 30, from 30 to 50, from 30 to 40, or from 40 to 50. In general, the stronger the ligand binds, the higher the stability constant. While not wishing to be bound by theory, having a stable metal complex can prevent addition of metal ions affecting the self-assembly processes that create the mesostructure. Also, stronger binding of the ligand means the ligand stays bound to the metal at higher temperatures, which raise the temperature at which the metal is released or reduced, and so results in smaller nanoparticles and higher catalytic activity. Examples of suitable ligands are organic monoacids, specific examples include, acetic acid (acetate), propanoic acid (propanoate), citric acid (citrate), formic acid (formate), fumaric acid (fumarate), lactic acid (lactate), maleic acid (maleate), benzoic acid (benzoate), and any amino acids. Some suitable ligands are bidentate, tridentate, or quadridentate, that is having two, three or four atoms capable of interacting with the metal. Metal salts suitable for use herein can be readily obtained from commercial suppliers or synthesized by methods known in the art. Similarly metal salt hydrates and metal salt solutions can be prepared by methods known in the art or obtained from commercial sources. Other suitable ligands include organic or inorganic ions, such as carbonate, bromide, sulfate, iodide, chloride, phosphate, sulfite, phosphite, nitrite, and combinations thereof. Preferred ligands are acetate and citrate. In some examples, the ligand is not nitrate.

In some examples the surfactant is a nonionic surfactant. Examples of nonionic surfactants that can be used herein include ethylene glycol monostearate, propylene glycol myristate, glyceryl monostearate, glyceryl stearate, polyglyceryl-4-oleate, sorbitan acylate, sucrose acylate, PEG-150 laurate, PEG-400 monolaurate, polyoxyethylene monolaurate, polysorbates, polyoxyethylene octylphenylether, PEG-1000 cetyl ether, polyoxyethylene tridecyl ether, polypropylene glycol butyl ether, poloxamer 401, poloxamer 407, stearoyl monoisopropanolamide, and polyoxyethylene hydrogenated tallow amide. In some examples the surfactant is amphoteric surfactant. Examples of amphoteric surfactants that can be used herein include sodium N-dodecyl-β-alanine, sodium N-lauryl-β-iminodipropionate, myristoamphoacetate, and lauryl betaine and lauryl sulfobetaine. In a preferred embodiment, the surfactant is poloxomer 407, which is triblock copolymer of a central block of polypropylene glycol flanked by two blocks of polyethylene glycol. The approximate lengths of the two PEG blocks is 101 repeat units while the approximate length of the polypropylene glycol block is 56 repeat units. This is also sold as Pluronic F127.

In some specific examples, the surfactant is a poloxamer, which are nonionic triblock copolymers comprising poloxypropylene and polyoxyethylene. Poloxomers are sold under the tradenames Pluronics (BASF), synperionics (Croda International), and Kolliphor (BASF). Specific examples of poloxamers that can be used herein are Pluronics P123, 17R2, L-64, L-92, L-62, P-104, L-121, P-65, 25R4, sold by BASF.

Additional examples of surfactants that can be used belong to the Brij™ family, such as octaethylene glycol monohexadecyl ether. Additional members of this family that can be used are: Brij 30 (Polyoxyethylene 4 lauryl ether) Brij 35 (Polyoxyethylene 23 lauryl ether), Brij 52 (Polyoxyethylene 2 cetyl ether), Brij 56 (Polyoxyethylene 10 cetyl ether), Brij 58 (Polyoxyethylene 20 cetyl ether), Brij 72 (Polyoxyethylene 2 stearyl ether), Brij 76 (Polyoxyethylene 10 stearyl ether), Brij 78 (Polyoxyethylene 20 stearyl ether), Brij 92 (Polyoxyethylene 2 oleyl ether), Brij 97 (Polyoxyethylene 10 oleyl ether), Brij 98 (Polyoxyethylene 20 oleyl ether), Brij 700 (Polyoxyethylene 100 stearyl ether), which are available from Croda International. Polyoxyethylene (20) sorbitan monooleate (Tween), from Croda International can also be used.

Additional examples of surfactants that can be used are sorbitan esters, examples of which include sorbitan monoisostearate, sorbitan sesquiisostearate, sorbitan diisostearate, sorbitan triisostearate, sorbitan monooleate, sorbitan sesquioleate, sorbitan dioleate, sorbitan trioleate, sorbitan monoerucate, sorbitan sesquierucate, sorbitan dierucate, sorbitan trierucate, sorbitan monoricinoleate, sorbitan sesquiricinoleate, sorbitan diricinoleate, sorbitan triricinoleate, sorbitan monohydroxystearate, sorbitan sesquihydroxystearate, sorbitan dihydroxystearate, sorbitan trihydroxystearate, sorbitan monotartrate, sorbitan sesquitartrate, sorbitan ditartrate, sorbitan tritartrate, sorbitan monocitrate, sorbitan sesquicitrate, sorbitan dicitrate, sorbitan tricitrate, sorbitan monomaleate, sorbitan sesquimaleate, sorbitan dimaleate, sorbitan trimaleate, and technical-grade mixtures thereof. Addition products of 1 to 30, preferably 5 to 10, mol of ethylene oxide onto the specified sorbitan esters are likewise suitable.

Additional examples of surfactants that can be used are polyglycerol esters, examples of which include polyglyceryl-2 dipolyhydroxystearate (Dehymuls™ PGPH), polyglycerol-3 diisostearate (Lameform™ TGI), polyglyceryl-4 isostearate (Isolan™ GI 34), polyglyceryl-3 oleate, diisostearoyl polyglyceryl-3 diisostearate (Isolan™ PDI), polyglyceryl-3 methylglucose distearate (Tego Care™ 450), polyglyceryl-3 beeswax (Cera Bellina™), polyglyceryl-4 caprate (Polyglycerol Caprate T2010/90), polyglyceryl-3 cetyl ether (Chimexane™ NL), polyglyceryl-3 distearate (Cremophor™ GS 32) and polyglyceryl polyricinoleate (Admul™ WOL 1403) polyglyceryl dimerate isostearate, and mixtures thereof. Examples of further suitable polyol esters are the mono-, di- and triesters of trimethylolpropane or pentaerythritol with lauric acid, coconut fatty acid, tallow fatty acid, palmitic acid, stearic acid, oleic acid, behenic acid and the like, optionally reacted with 1 to 30 mol of ethylene oxide.

The surfactant should be used in disclosed methods at a concentration above its critical micelle concentration. While not wishing to be bound by theory, at concentrations above the critical micelle concentration in the solution used, the surfactant would form a liquid crystal phase that would incorporate the first polymer precursor (e.g., resorcinol) and polymerize to give a monolithic system.

In some examples, the crosslinking agent can be a diamino compound, such as diamino hexane, diamino pentane, diamino butane, diamino propane, diamino ethane, lysine, dicyandiamide, and the like.

Compositions

The hierarchically porous materials disclosed herein can comprise a plurality of discreet nanoparticles. The hierarchically porous materials comprise a plurality of macropores that interconnect, forming a continuous network of pores that spans the porous material. The walls of the macropores comprise a plurality of mesopores, thereby forming a hierarchically porous material. The walls of the macropores and mesopores comprise a continuous carbon phase on which is dispersed a plurality of discreet nanoparticles.

The materials can be described as porous. As such, the materials possess a plurality of pores, holes, and/or channels, each of which may or may not extend throughout the entire length of the material. The pores can interconnect, resulting in a network of pores or voids that spans the material, permitting the flow of liquid or gas into and through the material, i.e., a continuous phase of pores or voids. The materials can also be described as bicontinuous (i.e., the materials have two or more continuous phases), meaning that both a voids/pore phase and a carbon phase are continuous throughout the material.

The materials can be hierarchically porous. As described herein, hierarchical porous materials have pores that span two or more length scales. The materials described herein possess both macropores and mesopores. In some embodiments, the materials can optionally further contain micropores.

The materials can comprise a plurality of macropores. Macropores are pores or voids having a diameter greater than about 0.1 µm. For example, the macropores can have a diameter greater than about 0.5 µm, greater than about 0.75 µm, greater than about 1.0 µm, greater than about 1.5 µm, greater than about 2.0 µm, greater than about 2.5 µm, greater than about 5 µm, greater than about 10 µm, greater than about 15 µm, or greater. In some embodiments, the macropores have a diameter of less than about 50 µm (e.g., less than about 40 µm, less than about 30 µm, less than about 25 µm, less than about 20 µm, less than about 15 µm, less than about 10 µm, less than about 7.5 µm, less than about 5 µm, less than about 2.5 µm, less than about 2.0 µm, less than about 1.5 µm, less than about 1.0 µm, less than about 0.75 µm, less than about 0.5 µm, less than about 0.25 µm, or less).

The macropores can have a diameter ranging from any of the minimum values to any of the maximum values described above. In some embodiments, the macropores have a diameter of from about 0.1 µm to about 50 µm. In certain instances, the macropores have a diameter of from about 0.5 µm to about 30 µm, from about 1 µm to about 20 µm, from about 5 µm to about 15 µm, from about 10 µm to about 30 µm, or from about 0.5 µm to about 15 µm in diameter. The macropores can have a substantially constant diameter along their length.

In some embodiments, the diameter of the macropores is substantially constant from macropore to macropore throughout the material, such that substantially all (e.g., at least 75%, at least 80%, at least 85%, at least 90%, or at least 95%) of the macropores in the material have a diameter that is within 40% of the average macropore's diameter (e.g., within 35% of the average macropore's diameter, within 30% of the average macropore's diameter, within 25% of the average macropore's diameter, within 20% of the average macropore's diameter, within 15% of the average macropore's diameter, or within 10% of the average macropore's diameter).

The walls of the macropores are formed from a continuous carbon phase. In some embodiments, the walls have a thickness of from about 50 nm to about 15 µm, for example, from about 50 nm to about 600 nm, 100 nm to about 500 nm, from about 200 to about 400 nm, from about 50 to about 200, from about 300 to about 600 nm, from about 500 nm to about 5 µm, from about 5 µm to about 10 µm, or from about 5 µm to about 15 µm.

The walls of the macropores comprise a plurality of mesopores, thereby forming a hierarchically porous material. Mesopores are pores, holes, voids, and/or channels having a diameter ranging from about 2 nm to about 50 nm.

For example, the mesopores can have a diameter greater than about 2 nm, greater than about 3 nm, greater than about 4 nm, greater than about 5 nm, greater than about 7.5 nm, greater than about 10 nm, greater than about 15 nm, greater than about 20 nm, greater than about 25 nm, greater than about 30 nm, or greater. In some embodiments, the mesopores have a diameter of less than about 50 nm (e.g., less than about 40 nm, less than about 35 nm, less than about 30 nm, less than about 25 nm, less than about 20 nm, less than about 15 nm, less than about 10 nm, less than about 7.5 nm, less than about 6 nm, less than about 5 nm, or less). For example, the mesopores can have a diameter ranging from about 2 nm to about 30 nm, from about 10 nm to about 20 nm, from about 15 nm to about 50 nm, from about 2 nm to about 6 nm, or from about 2 nm to about 15 nm in diameter.

The mesopores can have a substantially constant diameter along their length. In some embodiments, the diameter of the mesopores is substantially constant from mesopore to mesopore throughout the material, such that substantially all (e.g., at least 75%, at least 80%, at least 85%, at least 90%, or at least 95%) of the mesopores in the material have a diameter that is within 40% of the average mesopore's diameter (e.g., within 35% of the average mesopore's diameter, within 30% of the average mesopore's diameter, within 25% of the average mesopore's diameter, within 20% of the average mesopore's diameter, within 15% of the average mesopore's diameter, or within 10% of the average mesopore's diameter).

The walls of the mesopores are formed from a continuous carbon phase. In some embodiments, the walls have a thickness of from about 5 nm to about 15 µm, for example, from about 5 nm to about 10 µm, from about 5 nm to about 5 µm, from about 5 nm to about 1 µm, from about 5 nm to about 800 nm, from about 5 nm to about 600 nm, from about 5 nm to about 500 nm, from about 5 nm to about 400 nm, from about 5 nm to about 200 nm, from about 5 nm to about 10 nm, from about 5 nm to about 50 nm, or from about 5 nm to about 25 nm. In some instances the walls have a thickness of greater than 5 nm (e.g., greater than 10 nm, greater than 15 nm, greater than 20 nm, or greater).

In some embodiments, the walls of the macropores, mesopores, or combinations thereof further contain micropores. Micropores are pores, holes, and/or channels that have a diameter of less than about 2 nm. For example, micropores can have a diameter ranging from about 0.5 nm to 2 nm. The walls of the micropores can be formed from a continuous carbon phase.

The hierarchically porous materials described herein can be characterized as possessing two or more continuous phases (e.g., a void phase and a carbon phase). The two or more phases are generally tortuous, such that the two or more phases are interpenetrating.

In some embodiments, substantially all of the pores in the hierarchically porous material are open pores, and substantially none of the pores are closed pores. Closed pores are defined as pores which are completely surrounded by solid material, whereas open pores are defined as pores that are not completely surrounded by solid material. Thus in open porous materials (i.e., porous materials wherein substantially all of the pores in the porous material are open pores), substantially all of the pores in the material are part of a continuous void phase.

In certain embodiments, the hierarchically porous materials can comprise two continuous void phases that are completely separated by a third continuous carbon phase that prevents any direct contact between the two continuous void phases. Such materials may be said to be hollow. In these embodiments, the carbon phase can be optionally porous on a much smaller scale than the void phases. When the hierarchically porous materials have a hollow geometry, they can optionally be even-walled. In even-walled materials, the third continuous carbon phase that separates the two continuous void phases is of substantially constant thickness, such that the distance between one continuous void phase and the other continuous void phase is substantially constant throughout the material.

The hierarchically porous materials described herein are structurally distinct from foams. Foams can exist in two primary forms. In closed-cell foams, void regions are completely enclosed within a continuous solid region. Such closed-cell foams are not bicontinuous. Open-cell foams can be bicontinuous; however, open-cell foams possess the void network that is disordered.

Specifically, the diameters of the pores in open-cell foams vary greatly over a large range, often with large spherical voids separated from each other by small windows. In contrast, the hierarchically porous materials described herein are bicontinuous, and can have a narrow pore size distribution (e.g., less than two standard deviations in pore diameter, or less than one standard deviation in diameter).

The hierarchically porous materials are not etch materials, whereby ionizing radiation is used to form the pores. In some embodiments, the hierarchically porous materials are substantially free (i.e., having less than about 1% by weight of the porous material) of surfactant. In some embodiments, the hierarchically materials are substantially free (having less than about 1, 0.1, or 0.01% by weight of the porous material) of silica. In some embodiments, the continuous carbon phase is substantially free (having less than about 1, 0.1, or 0.01% by weight of the porous material) of metals or metal oxides.

The hierarchically porous materials described herein can have very high surface areas. For example, the surface area can be greater than about 50, 75, 100, 200, 400, 600, 800, 1000, 1200, 1400, 1600, 1800, or 2000 $m^2/g$ material, where any of the values described above can be the upper or lower endpoint of a surface area range. In some examples, the hierarchically porous material has a surface area that ranges from about 200 $m^2/g$ material to about 2000 $m^2/g$ material, from about 300 $m^2/g$ material to about 1000 $m^2/g$ material, of from about 400 $m^2/g$ material to about 8000 $m^2/g$ material.

In some embodiments, the hierarchically porous material is a monolith. For example, the hierarchically porous material can be a macroscopic, single piece of material typically with one or more dimensions (length, width, and/or height) exceeding about 0.1 mm (e.g., at least about 0.2 mm, at least about 0.4 mm, at least about 0.5 mm, at least about 0.6 mm, at least about 0.8 mm, at least about 1.0 mm, at least about 1.5 mm, or greater). In some instances, the hierarchically porous material possesses more than one dimension that is greater than about 0.1 mm. In other embodiments, the hierarchically porous material can be a particle. Particulate materials can be formed from monolithic materials using particle size reduction techniques such as grinding, milling (e.g., air-attrition milling (jet milling) or ball milling).

The hierarchically porous materials further comprise a plurality of discreet nanoparticles.

The nanoparticles are dispersed on the carbon phase of the hierarchically porous material. As such, the hierarchically porous material serves as a solid support for the nanoparticles.

The nanoparticles can be evenly dispersed throughout the hierarchically porous material, such that the concentration of nanoparticles deposited on the carbon phase near the surface of the hierarchically porous material is substantially similar to the concentration of nanoparticles deposited on the carbon phase near the interior of the hierarchically porous material. In certain embodiments, the concentration of nanoparticles present in the interior of the hierarchically porous material, when measured as the weight percent of metal atoms present in the interior of the hierarchically porous material as determined using energy dispersive x-ray spectroscopy, is within 50% (e.g., within 45%, within 40%, within 35%, within 30%, within 25%, within 20%, within 15%, within 10%, or within 5%) of the concentration of nanoparticles present on the exterior of the hierarchically porous material, when measured as the weight percent of metal atoms present on the exterior of the hierarchically porous material as determined using energy dispersive x-ray spectroscopy.

In addition, the nanoparticles can be evenly dispersed on the carbon phase, such that the distance between adjacent particles deposited on the carbon phase is relatively consistent. In these cases, the nanoparticles are not present as aggregates or agglomerates on the carbon phase. The resulting hierarchically porous materials possess a plurality of discreet nanoparticles evenly dispersed walls of the macropores and mesopores. In some embodiments, the nanoparticles are dispersed on the carbon phase such that the average distance between adjacent nanoparticles on the carbon phase, as determined by analysis of scanning electron microscopy micrographs, is at least 0.5 times the average nanoparticle diameter (e.g., at least 0.75 times the average nanoparticle diameter, at least the average nanoparticle diameter, at least 1.5 times the average nanoparticle diameter, at least 2 times the average nanoparticle diameter, at least 2.5 times the average nanoparticle diameter, at least 3 times the average nanoparticle diameter, at least 5 times the average nanoparticle diameter, at least 7.5 times the average nanoparticle diameter, at least 10 times the average nanoparticle diameter, at least 15 times the average nanoparticle diameter, at least 20 times the average nanoparticle diameter, at least 25 times the average nanoparticle diameter, at least 50 times the average nanoparticle diameter, or at least 100 times the average nanoparticle diameter.

In some cases, the nanoparticles are inorganic nanoparticles formed from a catalytically active metal, metal oxide, or combinations thereof. For example, the nanoparticles can be formed from a metal selected from the group consisting of Ti, V, Cr, Mn, Fe, Co, Ni, Cu, Zr, Nb, Mo, Tc, Ru, Rh, Pd, Ag, Hf, Ta, W, Re, Os, Ir, Pt, Au, La, Ce, Pr, Nd, Pm, Sm, Eu, Gd, Tb, Dy, Ho, Er, Tm, Yb, and any combination thereof. In specific examples, the nanoparticles are selected from the group consisting of Pd, Pt, Ni, Cr, and any combination thereof.

Characteristics of the nanoparticles, including particle size and specific surface area, can be varied in view of the desired application for the hierarchically porous material. Generally, the nanoparticles have an average particle size that is smaller than the diameter of the mesopores. In some embodiments, the nanoparticles have an average particle size, as determined by scanning electron microscopy, of at least about 2 nm (e.g., at least about 5 nm, at least about 10 nm, at least about 15 nm, at least about 25 nm, at least about 35 nm, or greater). In some embodiments, the nanoparticles have an average particle size of less than about 50 nm (e.g., less than about 45 nm, less than about 40 nm, less than about 35 nm, less than about 30 nm, less than about 25 nm, less than about 20 nm, less than about 15 nm, less than about 10 nm, less than about 5 nm, or less).

The nanoparticles can have an average particle size ranging from any of the minimum values to any of the maximum values described above. In certain embodiments, the nanoparticles have an average particle size ranging from about 2 nm to about 50 nm (e.g., ranging from about 2 nm to about 30 nm, ranging from about 5 nm to about 10 nm, or ranging from about 5 nm to about 20 nm)

In some embodiments, the population of nanoparticles is a monodisperse population of particles. In other embodiments, the population of nanoparticles is a polydisperse population of nanoparticles. In some instances where the population of nanoparticles is polydisperse, greater that 50% of the particle size distribution (e.g., greater than 60% of the particle size distribution, greater than 70% of the particle size distribution, greater than 75% of the particle size distribution, greater than 80% of the particle size distribution, greater than 85% of the particle size distribution, or greater than 90% of the particle size distribution) lies within 10% of the median particle size.

In some embodiments, the nanoparticles can have a specific surface area of at least about 1 $m^2/g$ of nanoparticles (e.g., at least about 1 $m^2/g$ of nanoparticles, at least about 5 $m^2/g$ of nanoparticles, at least about 10 $m^2/g$ of nanoparticles, at least about 15 $m^2/g$ of nanoparticles, at least about 25 $m^2/g$ of nanoparticles, at least about 50 $m^2/g$ of nanoparticles, at least about 100 $m^2/g$ of nanoparticles, at least about 200 $m^2/g$ of nanoparticles, at least about 250 $m^2/g$ of nanoparticles, at least about 300 $m^2/g$ of nanoparticles, at least about 400 $m^2/g$ of nanoparticles, at least about 500 $m^2/g$ of nanoparticles, at least about 600 $m^2/g$ of nanoparticles, at least about 750 $m^2/g$ of nanoparticles, at least about 800 $m^2/g$ of nanoparticles, at least about 900 $m^2/g$ of nanoparticles, at least about 1000 $m^2/g$ of nanoparticles, at least about 1250 $m^2/g$ of nanoparticles, at least about 1500 $m^2/g$ of nanoparticles, at least about 1750 $m^2/g$ of nanoparticles, or greater).

In some embodiments, the nanoparticles have specific surface area of less than about 2000 $m^2/g$ of nanoparticles (e.g., less than about 1750 $m^2/g$ of nanoparticles, less than about 1500 $m^2/g$ of nanoparticles, less than about 1250 $m^2/g$ of nanoparticles, less than about 1000 $m^2/g$ of nanoparticles, less than about 750 $m^2/g$ of nanoparticles, less than about 500 $m^2/g$ of nanoparticles, less than about 400 $m^2/g$ of nanoparticles, less than about 300 $m^2/g$ of nanoparticles, less than about 250 $m^2/g$ of nanoparticles, less than about 200 $m^2/g$ of nanoparticles, less than about 100 $m^2/g$ of nanoparticles, less than about 50 $m^2/g$ of nanoparticles, less than about 25 $m^2/g$ of nanoparticles, less than about 15 $m^2/g$ of nanoparticles, less than about 10 $m^2/g$ of nanoparticles, less than about 5 $m^2/g$ of nanoparticles, or less).

The nanoparticles can have specific surface area ranging from any of the minimum values to any of the maximum values described above. In some embodiments, the nanoparticles have a surface area of from about 1 $m^2/g$ of nanoparticles to about 2000 $m^2/g$ of nanoparticles. In certain embodiments, the nanoparticles can have a large specific surface area (e.g., from about 500 $m^2/g$ of nanoparticles to about 2000 $m^2/g$ of nanoparticles).

The nanoparticles can also be incorporated into the hierarchically porous material in varying amounts. In some instances, the nanoparticles are present in an amount greater than 0% by weight (e.g., greater than about 0.1% by weight, greater than about 0.25% by weight, greater than about 0.5% by weight, greater than about 0.75% by weight, greater than about 1% by weight, greater than about 1.5% by weight, greater than about 2% by weight, greater than about 2.5% by weight, greater than about 5% by weight, greater than about 10% by weight, greater than about 15% by weight, greater than about 20% by weight, or greater), based on the total weight of the hierarchically porous material. The nanoparticles can be present in an amount less than about 30% by weight (e.g., less than about 25% by weight, less than about 20% by weight, less than about 15% by weight, less than about 10% by weight, less than about 5% by weight, less than about 2.5% by weight, less than about 2% by weight, less than about 1.5% by weight, less than about 1% by weight, or less than about 0.5% by weight), based on the total weight of the hierarchically porous material.

The nanoparticles can be present in a range from any of the minimum values to any of the maximum values described above. For example, the nanoparticles can be present in an amount from greater than 0% by weight to about 30% by weight, based on the total weight of the hierarchically porous material (e.g., from about 25% by weight to about 30% by weight, from about 0.1% by weight to about 10% by weight, or from about 0.1% by weight to about 1.5% by weight).

In certain embodiments, the hierarchically porous materials do not release nanoparticles when contacted with a fluid.

The combination of metal supported hierarchically porous carbon and the heterogeneous catalysis with high surface area play a significant role in the selectivity and cost reduction of catalysts. Catalysts designed in this way generally involve length scales ranging from the atomic to the pellet scale (Rongqing Y, et al. Platinum deposition on carbon nanotubes via chemical modification. *Chem. Materials*, 1998, 10(3): 718-722; Chekin F, et al., Preparation and electrochemical performance of graphene-Pt black nanocomposite for electrochemical methanol oxidation. *J. Solid*

State Electrochem., 2014, 18: 893-898). However, the activity of heterogeneous catalysts supported on carbon materials depends on the atomic structure of its active site. The activity of catalysts depends on the surface of porous network, intrinsic and composition properties, surface size, etc. In general, the structures of the catalysts control the quantity of any species to be bound and converted on the catalyst surface. The accessibility of the catalysts in carbon supported materials can be enlarged by distributing the sites in a microscopically non-uniform way (Shen Y, et al. In-situ catalytic conversion of tar using rice husk-char supported nickel-iron catalysts for biomass pyrolysis/gasification. *Applied Catalysis B: Environ.*, 2014, 152(1): 140-151; Xiao Y, et al., Review on the properties of nano-/microstructures in the catalyst layer of PEMFC. *J. Fuel Cell Sci. Tech.*, 2011, 8(3): 1-13). An additional advantage of supported catalysts is the active surface area and porosity in relation to the total catalyst loading to achieve high dispersion of the active site in the catalyst. Furthermore, surface chemical properties are another characteristic of carbon that has to be taken into account to explain the catalytic behavior of a carbon supported catalyst system (Rui L, et al. Sulfonated ordered mesoporous carbon for catalytic preparation of biodiesel. *Carbon*, 2008, 46(13): 1664-1669). The surface of carbon contains heteroatoms (O, N, H), which as a result, can confer on the carbon surface an acid-base and hydrophilic character (Richard R S. Multiple metal carbon bonds for catalytic metathesis reactions (Nobel Lecture). *Angewandte Chemie International Ed.*, 2006, 45(23): 3748-3759). Some studies have been done on the role of surface oxygen groups in the dispersion and resistance to sintering of carbon supported metal catalysts (Lordi V, et al., Method for supporting platinum on single-walled carbon nanotubes for a selective hydrogenation catalyst. *Chem. Materials*, 2001, 13(3): 733-737). Therefore, many carbon-based materials with tunable properties have been explored for possible utilization as catalyst supports.

Methods of Use

Disclosed herein are methods for the use of the disclosed hierarchically porous carbon monoliths as heterogeneous catalyst in a catalytic reaction. For example, the disclosed monoliths can be used for the following catalytic reactions: hydrogenation reactions, reduction reactions, a catalytic conversion of a monoolefin to an alkane, a catalytic conversion of a diolefin to a monoolefin, a catalytic hydrogenation of an acetylene group, a catalytic hydrogenation of an aromatic ring, a catalytic hydrogenation of a heteroaromatic ring, a catalytic conversion of a nitro group to an amine, a catalytic conversion of a nitroso group to an amine group, a catalytic conversion of a hydrazone group to a hydrazine group, a catalytic conversion of an imine group to an amine group, a catalytic conversion of a nitrile group to an amine group, a catalytic reductive alkylation, a catalytic reductive amination, a catalytic disproportionation reaction, or a catalytic Rosenmund reaction, and carbon-carbon bond coupling.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention, which are apparent to one skilled in the art.

Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Ethyl alcohol (EtOH, 99%), non-ionic surfactant Pluronic F127 (99.9%), 1,6-diaminohexane (DAH, 99.5%), formalin and styrene (>99%), and chromium(III) acetate were obtained from Aldrich (St. Louis, Mo.). Resorcinol (99.9%) was purchased from Riëdel-De Haen Ag Seelze, Hannover. Tetraammine palladium (II) chloride monohydrate [Pd$(NH_3)_4Cl_2.H_2O$, 99.9%] was purchased from Alfa Aesar, Ward Hill, Mass. 1 wt % Pd/C catalyst extrudates were purchased from Alfa Aesar (a Johnson-Matthey (JM) company, Ward Hill, Mass.). Nickel (II) acetate, tetrahydrate (Ni$(CH_3CO_2)_2(H_2O)_4$, 99+%) was purchased from Acros Organics, New Jersey, USA.

Example 1

Palladium Supported on Carbon (Pd/C)

The Pd/C (4.7 g) material with 1 wt % and 5 wt % palladium (Pd) on carbon were synthesized using a co-gelation method. Specifically, In a 500 mL beaker, 9 g resorcinol crystals, 3.75 g of F127, 27 g of EtOH and deionized (DI) water (27 g) was added to the same beaker and the solution was stirred until a transparent brown solution was observed. The Pd$(NH_3)_4Cl_2.H_2O$ salt (0.1168 g, 1 wt % Pd loading) was added to the transparent brown solution. The solution was stirred for 10 min until all the salt was dissolved. DAH (0.234 g) was added making the solution basic and the solution was stirred for 30 min. Formalin solution (13.26 g) was added to the solution and stirred for 10 min. The resultant cloudy brown solution was degassed under vacuum for 10 min to remove trapped air and transferred to cylindrical molds. The molds were sealed with lids and placed in a pressure vessel that contained 50 mL each of EtOH and DI water. The pressure vessel was kept at 80° C. in an oven for 24 h. After cooling to room temperature, the monoliths were removed from the pressure vessel and kept at 60° C. for two days in an oven (to allow maximum evaporation of the solvent). The resultant gel monoliths were removed from the molds and then dried at 100° C. in a tubular furnace under $N_2$ gas flow. The dried monolithic columns were then simultaneously carbonized and the Pd was reduced under 5% $H_2/N_2$ by heating to 500° C. at a rate of 1° C./min, and kept at 500° C. for 2 h. The resulting Pd/C monoliths were black. See FIG. 1 showing the Pd/C material was produced as monolithic black cylinders, with a typical length of about 1.2 cm and diameter of about 0.85 cm.

Analysis by scanning electron microscopy showed that the as prepared material retained the macropore structure observed in the material prepared without added palladium salts (Hao, G.-P.; et al., Structurally Designed Synthesis of Mechanically Stable Poly(benzoxazine-co-resol)-Based Porous Carbon Monoliths and Their Application as High-Performance $CO_2$ Capture Sorbents. *J. Am. Chem. Soc.* 2011, 133, 11378-11388). The material was found to have a surface area of 412 m²/g as determined by nitrogen adsorption analyzed using the BrunauerEmmett-Teller method (Brunauer, S.; et al., Adsorption of Gases in Multimolecular Layers. *J. Am. Chem. Soc.* 1938, 60 (2), 309-319). A mesopore volume of 0.414 cm³/g and a total pore volume of 0.997 cm³/g were found. Analysis of the pore size distribution using the method of Barrett, Joyner and Halenda (Barrett, E. P.; et al., The Determination of Pore Volume and Area Distributions in Porous Substances. I. Computations from Nitrogen Isotherms. *J. Am. Chem. Soc.* 1951, 73 (1), 373-380) gave a pore size distribution with pores in the 8-20 nm range. Analysis of X-ray diffraction gave peaks consistent with the presence of palladium metal. Scherrer analysis of the widths of the x-ray peaks gave a crystallite size of 35-63 nm.

Example 2

Nickel Supported on Hierarchically Porous Carbon (Ni/HPC)

Figure 6:
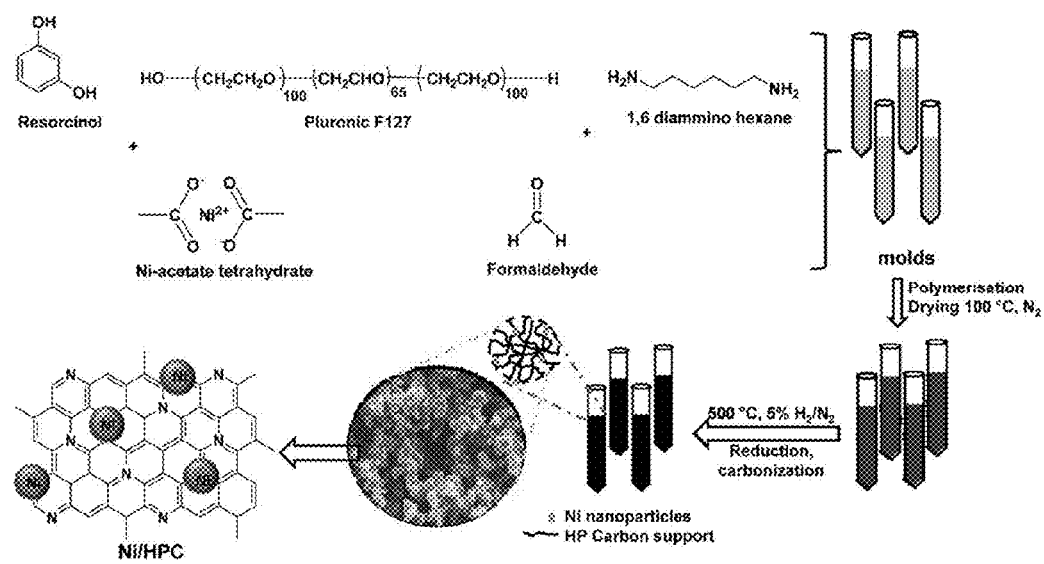
FIG. 6 is a schematic representation of the synthesis of Ni/HPC monoliths.

FIG. 6 shows a schematic representation of the synthesis of the Ni/HPC monolithic material. Ni/HPC were synthesized using a co-gelation sol-gel technique. The procedure includes resorcinol-formaldehyde polymerization in the presence of the weak base DAH, which acts as a catalyst to accelerate the rate of polymerization, and participates in the Mannich reaction to form poly (benzoxazine). The Ni-precursor $Ni(CH_3CO_2)_2(H_2O)_4$ was added before the addition of formaldehyde and so can potentially impact assembly of the ordered mesophase, the kinetics of polymerization and phase separation, and thereby the spinodal decomposition that produces the macrostructure. The drying, carbonization and reduction steps result in a final carbon skeleton with nitrogen incorporated from DAH along with Ni on the surface of the carbon support as shown in FIG. 6.

Specifically, nickel on hierarchically porous carbon materials with varying Ni loadings (0.5, 1, 2.5, 5 wt %) were prepared. A typical synthesis of the 1 wt % Ni/HPC monolith is as follows. In a 250 mL beaker, resorcinol crystals (9 g), 3.75 g of F127, ethyl alcohol (27 g) and deionized (DI) water (27 g) were added to the same beaker and the solution was stirred until a transparent brown solution was observed. DAH (0.2314 g) was added, making the solution basic and the solution was stirred for 15 min (pH~9.06). The $Ni(CH_3CO_2)_2(H_2O)_4$ salt (0.1415 g) was dissolved in 2 mL DI water and added to the transparent brown solution. The pH of the solution was observed to decrease to 8.79. Formalin solution (13.26 g) was added to the solution and stirred for 10 min. The resultant greyish, cloudy solution was degassed under vacuum for 10 min to remove the trapped air and transferred to cylindrical molds. The molds were sealed with lids and placed in a pressure cooker that contained 50 mL each of EtOH and DI water. The pressure vessel was placed in an oven at 80° C. for 24 h. After cooling to room temperature, the monoliths were removed from the pressure vessel and kept at 55° C. for two days in an oven (to allow maximum evaporation of the solvent). After being removed from the molds the resultant gel monoliths were dried at 100° C. in a tubular furnace under $N_2$ gas flow for 4 h. The dried monolithic columns were then simultaneously carbonized and the Ni was reduced by heating under 5% $H_2/N_2$ to 500° C. at a rate of 1° C./min and then holding the temperature at 500° C. for 2 h. The resulting Ni/C monoliths were black. Monoliths with 0.5, 2.5 and 5 wt % Ni loading can be similarly prepared using the same procedure described above. Hierarchically porous carbon (HPC) monoliths without Ni were also synthesized for comparison.

Analysis by scanning electron microscopy showed that the as prepared material retained the macropore structure observed in the material prepared without added nickel salt. The material was found to have a surface area of 458 m²/g as determined by nitrogen adsorption analyzed using the Brunauer-Emmett-Teller method. A mesopore volume of 0.477 cm³/g and a total pore volume of 0.663 cm³/g were found. Analysis of pore size distribution using the method of Barrett, Joyner and Halenda gave a maximum in the pore size distribution of 3.3 nm. Analysis of X-ray diffraction gave peaks consistent with the presence of nickel metal. Scherrer analysis of the widths of the x-ray peaks gave a crystallite size of 1.2-8.0 nm.

Figures 7A, 7B:
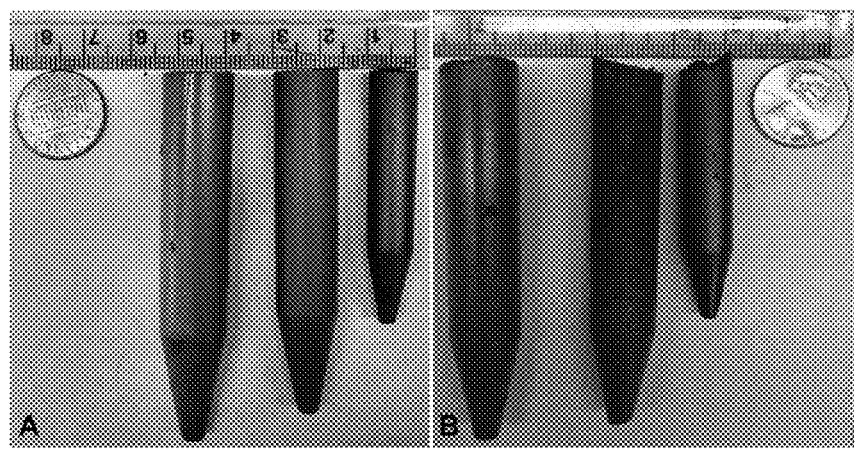
FIG. 7A is a picture of 1 wt % Ni/HPC.
FIG. 7B is a picture of 2.5 wt % Ni/HPC. An American one cent coin is shown to indicate scale.

As shown in FIGS. 7A and 7B, generally, the length and diameter of as synthesized Ni/HPC monoliths (rv7.243 g) were observed to be 7.8 cm and 1.4 cm, respectively. The monolith dried at 100° C. weighed rv1.813 g with length and diameter of 7.1 cm, and 1.3 cm, respectively. The final Ni/HPC material after pyrolysis (rv0.9317 g) was a monolithic black cylinder, with a typical length of 4.5 cm and diameter of 0.9 cm, corresponding to a weight-loss of 49% from the dried polymer and shrinkage of 36% across the diameter and 42% along the length of the monolith. All the Ni/HPC monoliths were extensively characterized in order to understand the textural and morphological properties of the material.

Example 3

Chromium on Porous Carbon Support

The procedure used for the preparation of monolithic 1Cr/C is similar to the one-pot co-gelation synthesis of Pd/C and Ni/HPC. The procedure involves base catalyzed polymerization of resorcinol-formaldehyde in which weak base DAH acts as catalyst to accelerate the rate of polymerization and also involves in the formation of poly(benzoxazine) via Mannich reaction. The synthesis was done in three different ways varying the order of addition of chromium(III) acetate (used as Cr precursor) solution/powder. The materials are denoted as 1Cr/CA, 1Cr/CB and 1Cr/CC, respectively where stands for 1 wt % loading of Cr metal on HPC support. This was done to study the impact of addition order on the self-assembly of the mesophase, polymerization and phase separation and hence the spinodal decomposition which produces the macrostructure. The final skeleton obtained after drying, carbonization and reduction steps leads to a carbon skeleton with nitrogen incorporated in it and Cr particles in and on the carbon matrix.

Generally, the length and diameter of the as synthesized 1Cr/C monoliths (~7.118 g) were observed to be 7.4 cm and 1.5 cm, respectively. The final 1Cr/C material after pyrolysis (0.9146 g) was a black monolithic cylinder with a typical length of 4.4 cm and diameter of 0.9 cm, corresponding to a weight loss of 87% from the cured monolith and shrinkage of 40.5% and 40% across the length and the diameter of the monolith, respectively. All the 1Cr/C materials were characterized to get an insight of the textural and morphological properties of the materials.

a) Synthesis of 1Cr/CA

In a 250 mL beaker, resorcinol crystals (4.5 g), 1.875 g of F127, ethyl alcohol (13.5 g) and deionized (DI) water (13.5 g) were added to the same beaker and the solution was stirred until a transparent brown solution was obtained (pH=5.5). Chromium(III) acetate (0.384 g) was dissolved in a 10 mL beaker with minimum amount of DI water and added to the resorcinol solution (pH=3.9). The solution turned cloudy purple. 1,6-diaminohexane (DAH) (0.117 g) was added, making the solution basic and the solution was stirred for 15 min (pH=8.9). Finally, 6.63 g of formalin solution was added and stirred for 10 min and the pH of this solution decreased to 7.4. The milky purple, non-transparent solution was then degassed under vacuum for 10 min to remove the trapped air and transferred to cylindrical molds. The molds were sealed with lids and placed in a pressure cooker that contained 50 mL each of EtOH and DI water. The pressure vessel was placed in an oven at 80° C. for 24 h for curing. After cooling to room temperature, the monoliths were removed from the pressure vessel and kept at 55° C. for two days in an oven (to allow maximum evaporation of the solvent). After being removed from the molds the resultant gel monoliths were dried at 100° C. in a tubular furnace under $N_2$ gas flow for 4 h. The dried monolithic columns were then simultaneously carbonized and the Cr salt was reduced by heating under 5% $H_2/N_2$ to 500° C. at a rate of 2° C./min and then holding the temperature at 500° C. for 2 h.

Analysis by scanning electron microscopy showed that the as prepared material retained the macropore structure observed in the material prepared without added chromium salt. The material was found to have a surface area of 512 $m^2/g$ as determined by nitrogen adsorption analyzed using the Brunauer-Emmett-Teller method. A mesopore volume of 0.137 cm3/g and a total pore volume of 0.302 $cm^3/g$ were found. Analysis of pore size distribution using the method of Barrett, Joyner and Halenda gave a maximum in the pore size distribution of 4.5 nm.

b) Synthesis of 1Cr/CB

In a 250 mL beaker, resorcinol crystals (4.5 g), 1.875 g of F127, ethyl alcohol (13.5 g) and deionized (DI) water (13.5 g) were added to the same beaker and the solution was stirred until a transparent brown solution was obtained (pH=5.5). Addition of DAH (0.117 g) basic solution was then stirred for 15 min (pH=8.9). Formalin solution (6.63 g) of was added and stirred for 10 min. The solution turned cloudy and the pH decreased to 7.6. Chromium(III) acetate (0.384 g) was dissolved in a 10 mL beaker with minimum amount of DI water and added to the resorcinol solution (pH=7.3). The solution turned cloudy purple. The molds were sealed with lids and placed in a pressure cooker that contained 50 mL each of EtOH and DI water. The pressure vessel was placed in an oven at 80° C. for 24 h for curing. After cooling to room temperature, the monoliths were removed from the pressure vessel and kept at 55° C. for two days in an oven (to allow maximum evaporation of the solvent). After being removed from the molds the resultant gel monoliths were dried at 100° C. in a tubular furnace under $N_2$ gas flow for 4 h. The dried monolithic columns were then simultaneously carbonized and the Cr salt was reduced by heating under 5% $H_2/N_2$ to 500° C. at a rate of 2° C./min and then holding the temperature at 500° C. for 2 h.

Analysis by scanning electron microscopy showed that the as prepared material retained the macropore structure observed in the material prepared without added chromium salt. The material was found to have a surface area of 513 $m^2/g$ as determined by nitrogen adsorption analyzed using the Brunauer-Emmett-Teller method. A mesopore volume of 0.103 $cm^3/g$, and a total pore volume of 0.297 $cm^3/g$ were found. Analysis of pore size distribution using the method of Barrett, Joyner and Halenda gave a maximum in the pore size distribution of 4.4 nm.

c) Synthesis of 1Cr/CC

In a 250 mL beaker, resorcinol crystals (4.5 g), 1.875 g of F127, ethyl alcohol (13.5 g) and deionized (DI) water (13.5 g) were added to the same beaker and the solution was stirred until a transparent brown solution was obtained (pH=5.5). DAH (0.117 g) was added, making the solution basic and the solution was stirred for 15 min (pH=8.9). Formalin solution (6.63 g) was added and stirred for 10 min. The solution turned cloudy and the pH decreased to 7.6. Chromium(III) acetate (0.384 g) powder was added to the above solution (pH=7.3). The solution was stirred for 30 min making the solution cloudy purple (pH 7.7). The molds were sealed with lids and placed in a pressure cooker that contained 50 mL each of EtOH and DI water. The pressure vessel was placed in an oven at 80° C. for 24 h for curing. After cooling to room temperature, the monoliths were removed from the pressure vessel and kept at 55° C. for two days in an oven (to allow maximum evaporation of the solvent). After being removed from the molds the resultant gel monoliths were dried at 100° C. in a tubular furnace under $N_2$ gas flow for 4 h. The dried monolithic columns were then simultaneously carbonized and the Cr salt was reduced by heating under 5% $H_2/N_2$ to 500° C. at a rate of 2° C./min and then holding the temperature at 500° C. for 2 h.

Analysis by scanning electron microscopy showed that the as prepared material retained the macropore structure observed in the material prepared without added chromium salt. The material was found to have a surface area of 552 $m^2/g$ as determined by nitrogen adsorption analyzed using the Brunauer-Emmett-Teller method. A mesopore volume of 0.078 $cm^3/g$, and a total pore volume of 0.298 $cm^3/g$ were found. Analysis of pore size distribution using the method of Barrett, Joyner and Halenda gave a maximum in the pore size distribution of 4.4 nm.

Example 4

Evaluation of Catalytic Activity

The hydrogenation of styrene to ethyl benzene was carried out as a model reaction to evaluate and compare the catalytic activity of the hierarchically porous Pd/C with commercial JM Pd/C catalyst. The hydrogenation was performed in the batch mode in a 250 mL one-necked round bottom flask. The flask was charged with 2.3 mL styrene, 100 mL EtOH (solvent), Pd/C catalyst (calculated for 1 mol. % Pd) and a magnetic stir bar, and placed on a magnetic stirrer. Both the heterogeneous catalysts were used in powdered form instead of the original monoliths and extrudates in order to ensure comparable access of the reactants to the catalyst surface. The catalysts were well ground using a mortar and pestle before adding to the reaction flask. The flask was evacuated under vacuum to ensure the removal of trapped air and moisture. The flask was covered with a rubber septum and fitted with a $H_2$ balloon (1 atm). The reaction mixture was vigorously stirred at RT for 24 h, and the reaction was monitored by gas chromatography (GC). The samples were analyzed using a Varian GC model CP-3800 fitted with EC-5 column (length 30 m×ID 0.25 mm×film thickness 0.25 μm).

The 1 wt % Pd/C made by the method of Example 1 showed 36.7% conversion of styrene whereas the 1 wt % Pd/C from a leading commercial manufacturer of Pd/C pellets showed a 51% styrene conversion. A low styrene conversion of 13% was obtained when 5 wt % Pd/C was used as catalyst. This is consistent with the lower SA, the lower mesopore volume and the larger Pd particles observed for 5 wt % Pd/C. The formation of ethyl benzene was confirmed by comparison of the retention time of the product with the measured retention time of pure ethyl benzene under the same conditions.

Example 5

Leaching Studies

Another objective was assessing the stability of the Pd particles on the carbon support, which is of primary concern for heterogeneous catalysts used in fixed bed reactors. To evaluate this stability, leaching tests were performed by using the monoliths as microreactors in a continuous flow system. The fixed bed of the continuous monolithic microreactor was constructed as follows: The 1 wt % Pd/C (one monolith, 0.214 g; 1.4 cm×0.85 cm) and 5 wt % Pd/C (one monolith, 0.129 g; 1 cm×0.8 cm) were separately positioned in heat shrinkable PTFE tube of 5 cm length. The PTFE tubing was then heated to provide a conformal fit to the exterior of the monolith. EtOH (250 mL) was pumped through the microreactor with a peristaltic pump at a constant flow rate of 2.1 mL/min. The effluent was collected and analyzed by Atomic Absorption Spectrometry to evaluate the Pd concentration in the spent solution. A total loss of Pd from 1 wt % Pd/C was found to be 18% whereas 23% Pd was found to leach from 5 wt % Pd/C. These values are comparable to commercial JM 1 wt % Pd/C catalyst extrudates where the leaching test found a total of 12% loss of Pd.

Example 6

$N_2$ Sorption Analyses

The nitrogen ($N_2$) physisorption measurements were recorded on a Quantachrome Nova 2200e pore size analyzer (Boynton Beach, Fla.) at −197° C. with He mode to determine surface area and void volume of the monoliths, respectively. Interpretation of the isotherms was done with Quantachrome NovaWin software version 11.1, using NL-DFT to obtain the surface area. The BET isotherm model was used to determine surface area and the Barrett-Joyner-Halenda (BJH) method was applied to the adsorption branch to calculate the pore size distribution.

Figure 2:
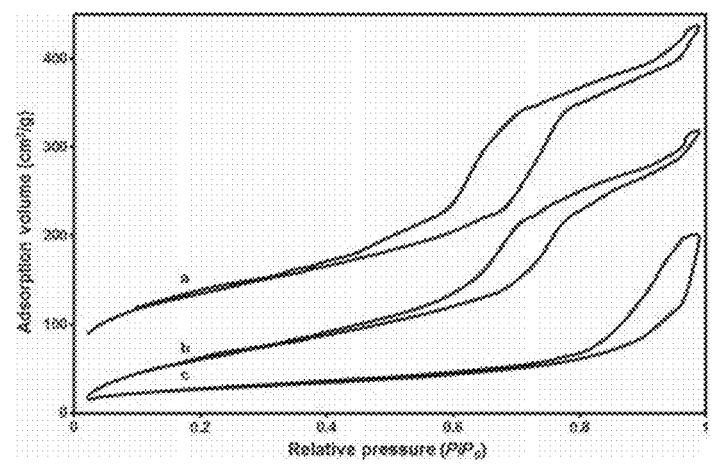
FIG. 2 is a graph of $N_2$ adsorption-desorption isotherms of carbon support (line a), 1 wt % Pd/C (line b), and 5 wt % Pd/C (line c).
Figure 8:
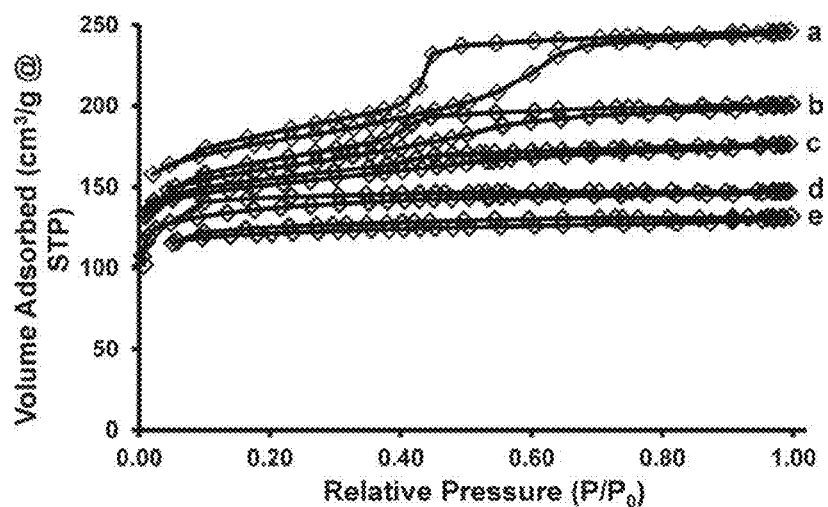
FIG. 8 is a graph of $N_2$ adsorption-desorption isotherms of HPC (line a), 0.5% (line b), 1% (line c), 2.5% (line d), and 5% (line e) Ni/HPC.
Figure 14:
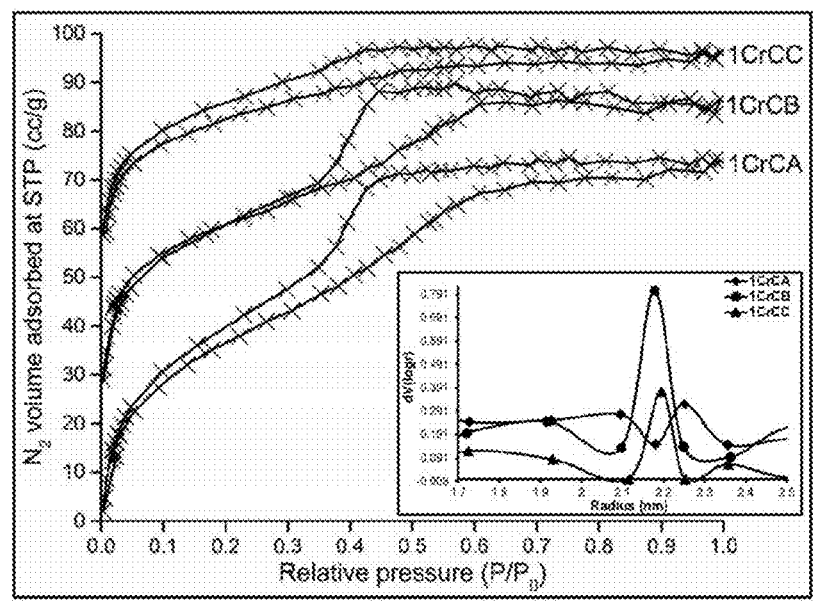
FIG. 14 shows $N_2$ sorption isotherms and BJH pore size distribution plots (inset) of 1Cr/C materials.
Figures 15A, 15B:
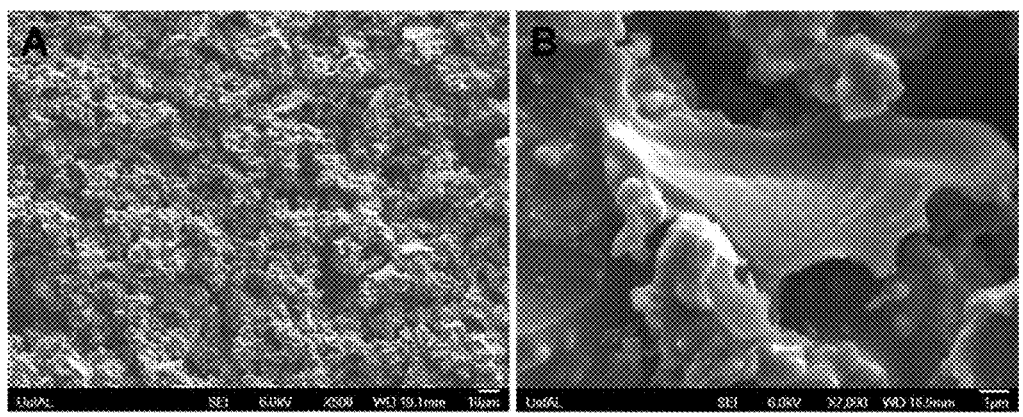
FIGS. 15A and 15B are SEM micrographs of 1Cr/CA at different magnifications using secondary electron imaging.

The $N_2$ adsorption/desorption isotherms of the carbon support and the Pd/C materials are shown in FIG. 2. The $N_2$ adsorption/desorption isotherms of the HPC support and the Ni/HPC materials are shown in FIG. 8. The $N_2$ adsorption/desorption isotherms of the Cr/C materials are shown in FIG. 14. Typical Type IV adsorption isotherms were observed for the materials. The presence of some mesopores in all materials was evident from the hysteresis loop observed between the adsorption and desorption branches.

In case of the isotherm of 1 wt % Pd/C (FIG. 2), two adsorption steps were clearly observed, one at relative pressures between 0.45 and 0.8 $P/P_0$ and the second above 0.9 $P/P_0$. The first $N_2$ uptake at relative pressure of 0.45 $P/P_0$ is due to filling of surfactant templated mesopores, whereas the second $N_2$ uptake at pressures above 0.9 $P/P_0$ is due to the filling of textural pores and macropores. The sorption isotherm of 5 wt % Pd/C showed $N_2$ uptake above 0.8 $P/P_0$ is attributed to the filling of textural pores and/or macropores. However, the hysteresis in $N_2$ uptake in the lower $P/P_0$ pressure range was not observed. The surface areas and pore diameters are given in Table I. The total surface area and mesopore volume both decrease on increasing incorporation of Pd into the carbon support. This could be due to disruption of the mesopore structure by the growing Pd nanoparticles, which have diameters that exceed the mesopore size. It is also possible that the DAH is displacing the ammonia ligands in the $Pd(NH_3)_4Cl_2.H_2O$ complex; it was expected that a primary amine, such as DAH could displace ammonia. This possibility is supported by the observation that the as-synthesized Pd/C monoliths are less mechanically robust than the parent carbon monoliths. DAH crosslinking is known to substantially increase the mechanical strength of these types of carbon monoliths. Changes in amine type and concentration are also known to impact the diameter and extent of mesopore and micropore formation (S. Köcher, et al., Oxime-substituted NCN-pincer palladium and platinum halide polymers through non-covalent hydrogen bonding (NCN=[$C_6H_2(CH_2NMe_2)_2$-2,6]-). *J. Organometal. Chem.* 2008, 693). Measurements of the pH of DAH solutions with and without Pd show pH changes consistent with displacement of the ammonia ligands by the DAH. DAH is a stronger base than is ammonia, and it is observed that as the $Pd(NH_3)_4Cl_2.H_2O$ complex is added, the pH drops from a pH of 11.88-11.71 for the 1 wt % Pd complex, to a pH of 11.34 for the 5 wt % Pd complex. DAH contains amine groups at each end of the alkyl chain, and it is possible that more than one ammonia group can be displaced from a Pd ion. This raises the possibility of formation of a coordination polymer in which DAH units bridge two Pd ions. Pd is known to form coordination polymers with aryl nitrogens (A. V. G. Netto, et al., Low-weight coordination polymers derived from the self-assembly reactions of Pd(II) pyrazolyl compounds and azide ion. *Polyhedron* 24, 2005, 1086), heterocyclic nitrogens (J. A. R. Navarro, et al., Borderline microporous-ultramicroporous palladium(II) coordination polymer networks. Effect of pore functionalisation on gas adsorption properties. *J. Mater. Chem.* 2007, 17, 1939); and with bidentate phosphorus containing ligands (S. Zhang, et al., A facile route for preparing a mesoporous palladium coordination polymer as a recyclable heterogeneous catalyst. *Dalton Trans.* 2012, 41, 4692; J. M. J. Paulusse, et al., Reversible, high molecular weight palladium and platinum coordination polymers based on phosphorus ligands. *Macromolecules* 2005, 38, 6290). Formation of such a polymer would be predicted to increase the viscosity of solutions of DAH and Pd ions. Viscosity measurements show significant increases in viscosity for DAH/Pd solutions over solutions of just DAH and just $Pd(NH_3)_4Cl_2.H_2O$, consistent with formation of a coordination polymer. The Pd ions it is less available to interact with the F127 to direct mesopore formation, which is consistent with the loss of ordered mesopores observed in Table I.

TABLE I

Textural properties of Pd/C monolithic materials.

| Sample | SBET ($m^2/g$) | Mesopore volume ($cm^3/g$) | Total pore volume ($cm^3/g$) | BJH pore size | Pd crystallite size analysis) |
|---|---|---|---|---|---|
| 1 wt % Pd/C | 412 | 0.414 | 0.997 | 8-20 | 35-63 |
| 5 wt % Pd/C | 186 | 0.196 | 0.378 | 7-20 | 52-105 |
| 'C'-support | 482 | 0.48 | 1.11 | 3.47 | — |

In case of the sorption isotherm of HPC (FIG. 8), one adsorption step was clearly observed at relative pressures between 0.4 and 0.75 $P/P_0$. This region of $N_2$ uptake is attributed to filling of surfactant templated mesopores, consistent with earlier reports for this material. However, with increasing Ni loading a significant decrease in the extent of $N_2$ uptake in the 0.45-0.75 $P/P_0$ range was observed. This is particularly evident from the BJH pore size distribution that shows that the narrow peak in the pore size distribution due to the F127 templated mesopores has disappeared completely. All the isotherms did not close until relative pressures below 0.1. This is lower than reported for HPC (G.-P. Hao, et al., Structurally designed synthesis of mechanically stable poly(benzoxazine-co-resol)-based porous carbon monoliths and their application as high-performance $CO_2$ capture sorbents, *J. Am. Chem. Soc.* 2011, 133, 11378-11388), but similar to other, similar, benzoxazine syntheses (G.-P. Hao, et al., Lysine-assisted rapid synthesis of crack-free hierarchical carbon monoliths with a hexagonal array of mesopores, *Carbon* 2011, 49, 3762-3772; M. Sevilla, et al., Fabrication of porous carbon monoliths with a graphitic framework, *Carbon* 2013, 56, 155-156).

The surface areas and pore diameters are given in Table II. The total surface area and mesopore volume both decrease on increasing incorporation of Ni into the carbon support. The surface area was observed to decrease from 560 $m^2/g$ for only HPC to 482 $m^2/g$ for 0.5% Ni/HPC and 374 $m^2/g$ for 5% Ni/C. The mesopore and total pore volumes were also seen to gradually decrease from HPC to 5% Ni/HPC. The micropore volumes observed do not change substantially with addition of Ni, and are consistent with other work reported for one pot benzoxazine based syntheses of carbon.

TABLE II

Textural properties of the Ni/HPC material.

| Sample | SA ($m^2/g$) | $V_{meso}$ ($cm^3/g$) | $V_{micro}$ ($cm^3/g$) | $V_{total}$ ($cm^3/g$) | Pore diameter (nm) | BL (nm)a |
|---|---|---|---|---|---|---|
| HPC | 560 | 0.214 | 0.167 | 0.381 | 5.5 | — |
| 0.5 wt % Ni/C | 482 | 0.119 | 0.200 | 0.319 | 3.4 | — |
| 1 wt % Ni/C | 458 | 0.056 | 0.186 | 0.242 | 3.3 | 1.2-8.0 |
| 2.5 wt % Ni/C | 429 | 0.018 | 0.219 | 0.237 | 3.2 | 6.2-18.0 |
| 5 wt % Ni/C | 374 | 0.015 | 0.146 | 0.161 | 3.1 | 27.4-31.8 | aCrystallite size of Ni-nanoparticles evaluated using Debye-Scherrer analysis calculated at different peaks corresponding to $Ni_0$.

In the case of Cr, the $N_2$ sorption isotherms of the 1Cr/C materials are shown in FIG. 14. Typical Type IV adsorption isotherms were observed in all 1Cr/C materials. The presence of some mesopores was observed from the hysteresis loop between adsorption and desorption branches.

The isotherms showed two adsorption steps, one between relative pressure of 0.35-0.75 $P/P_0$ and the second above 0.75 $P/P_0$. The first $N_2$ uptake corresponds to the filling of surfactant templated mesopores, whereas the second region of $N_2$ uptake is due to textural pore and macropores. The region between 0.35-0.75 $P/P_0$ is predominant for 1Cr/CA and 1Cr/CB, however, the loop appears to have flattened in case of 1CrC/C indicating the loss of mesopores.

The textural properties of the 1Cr/C materials shown in Table III were compared with the properties of HPC. The surface area of HPC was 560 $m^2/g$ with a pore diameter of 5.5 nm, total pore volume of 0.38 $cm^3/g$ and a very high mesopore volume of 0.214 $cm^3/g$. The surface areas of the 1Cr/C materials were found to reduce but not significantly with 552 $m^2/g$ for 1CrC/C and lowest of 511 $m^2/g$ for 1Cr/CA and 513 $m^2/g$ for 1Cr/CB. The pore diameters of the 1Cr/C materials (~4.4 nm) were lesser than HPC. However, the mesostructure was highly affected due to the presence of Cr in all the samples. There was notable difference in the mesopore volumes with highest of 0.137 $cm^3/g$ for 1Cr/CA and lowest of 0.078 $cm^3/g$ for 1Cr/CC. This is also seen from the BJH pore size distribution plots shown as the inset in FIG. 14. The order of addition during synthesis clearly impacted the formation of self-assembly of mesophase, based on the data obtained for the mesopore volume.

TABLE III

Textural properties of 1Cr/C materials

| Sample | SA ($m^2/g$) | $V_{micro}$ ($cm^3/g$) | $V_{meso}$ ($cm^3/g$) | $V_{tot}$ ($cm^3/g$) | Pore diameter (nm) |
|---|---|---|---|---|---|
| 1Cr/CA | 511.7 | 0.165 | 0.137 | 0.302 | 4.46 |
| 1Cr/CB | 513.1 | 0.194 | 0.103 | 0.297 | 4.36 |
| 1Cr/CC | 552.4 | 0.220 | 0.078 | 0.298 | 4.38 |

Example 7

XRD Studies

Powder X-ray diffraction (XRD) measurements were performed on a Bruker D8 Discover with GADDS (General Area Detector Diffraction System) (wavelength Co Kα, 1.79 Å) and a Hi-Star area detector.

Figure 3:
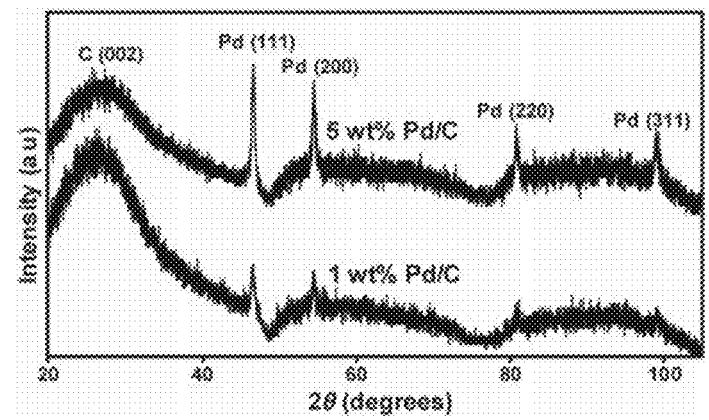
FIG. 3 is an X-ray diffractogram of 1 wt % and 5 wt. % Pd/C monoliths.

The XRD patterns of the Pd/C materials are shown in the FIG. 3. The XRD pattern of 5 wt % Pd/C predominantly shows peaks characteristic of face-centered cubic (fcc), crystalline Pd corresponding to (111), (200), (220), and (311) facets at 2θ=46.4°, 54.5°, 80.9°, and 98.9°, respectively. Only the (111) and (200) peaks are seen for the 1 wt % Pd/C. The band at 26.5° observed in both the cases corresponds to amorphous C(002). Debye-Scherrer analysis of the peak linewidths give an estimate of the Pd crystallite size (Table I), which shows that the 5 wt % Pd/C sample has significantly larger Pd nanoparticles. This is in agreement with the observations from the SEM data (FIGS. 4A-4C and FIG. 5A-5C).

Figure 11:
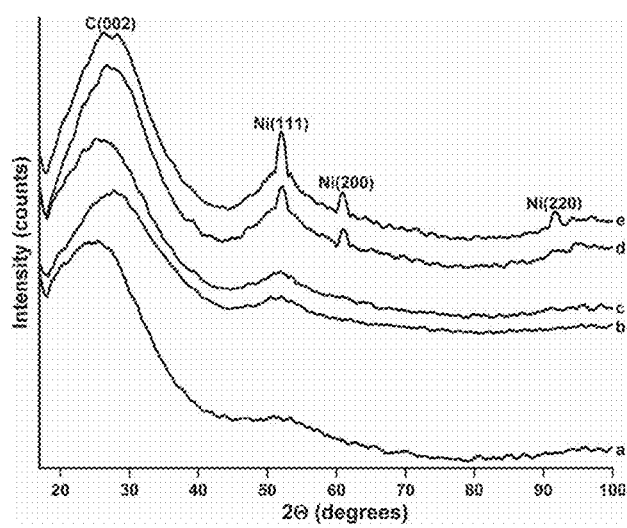
FIG. 11 is an X-ray Diffractogram of HPC (line a), 0.5% (line b), 1% (line c), 2.5% (line d), and 5% (line e) Ni/HPC.

The powder XRD patterns of Ni/HPC materials are displayed in FIG. 11. The XRD patterns of all the Ni/HPC samples showed a broad band centered at 27° corresponding to amorphous carbon (C(002)) with a peak interlayer spacing of 0.393 nm. No crystalline carbon peak was detected in any sample. The XRD patterns of 2.5 and 5 wt % Ni/C predominantly showed peaks characteristic of face centered cubic (fcc), crystalline metallic $N_{i0}$ corresponding to (111), (200) and (220) reflections at 2θ=51.9°, 60.8°, 91.5°, respectively and the respective interlayer d-spacing values were calculated to be 0.204 nm, 0.176 nm and 0.125 nm. No peaks corresponding to crystalline $N_{i0}$ were observed in samples with lower Ni loadings of 0.5 and 1 wt %. Peaks corresponding to nickel oxide (NiO) or nickel carbide (NiC) were not observed. Debye-Scherrer analysis of the peak line widths gave an estimate of the average Ni crystallite size (Table II), which showed the presence of significantly larger Ni nanoparticles in 5 wt % Ni/HPC sample compared to the other Ni loadings. The crystallite sizes from Debye-Scherrer analysis match well with the sizes of Ni nanoparticles observed from the SEM images.

Figure 19:
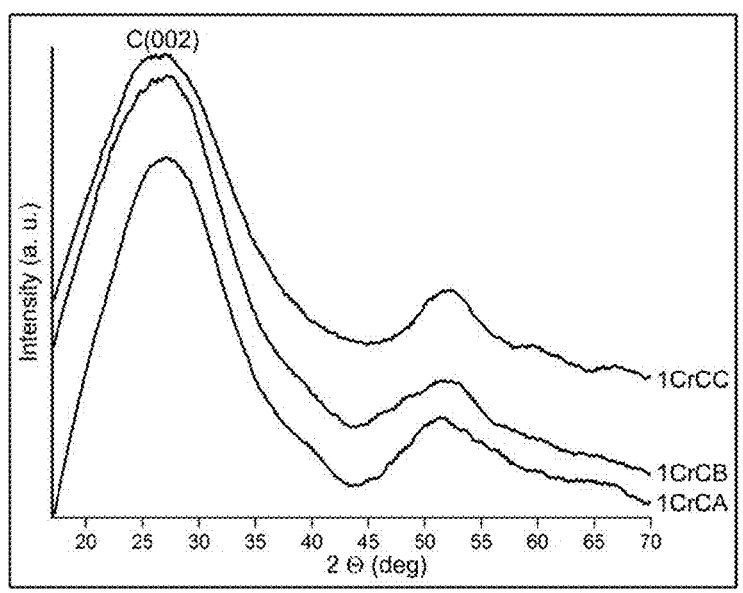
FIG. 19 is an X-ray Diffractogram of 1CrC samples.

The powder XRD patterns of 1Cr/C are exhibited in FIG. 19. The diffractograms of all the samples showed a broad band centered at 2θ~27° corresponding to amorphous carbon peak with an interlayer d-spacing of 0.381 nm. No crystalline peaks corresponding to carbon or chromium were detected in any sample. The full width at half maximum (FWHM) of the XRD peak at ~27° for CoKα is often used as indicator of the degree of ordering of the graphene sheets in carbon (Konios D, et al., Highly efficient organic photovoltaic devices utilizing work-function tuned graphene oxide derivatives as the anode and cathode charge extraction layers. *J. Material Chem. A*, 2016, 4, 1612-1623; Li Z Q, et al., X-ray diffraction patterns of graphite and turbostratic carbon. *Carbon*, 2007, 45, 1686-1695.). Full widths at half maxima were calculated for all the three samples to evaluate the extent of ordering of the carbon support. The FWHM values were calculated to be the lowest for 1Cr/CB(6.03°) and 1Cr/CA(6.94°) with highest FWHM of 10.34° for 1Cr/CC. These differences in the FWHM values are attributed to better ordering in the case of the carbon support of 1Cr/CA and 1Cr/CB.

Example 8

SEM Studies

Figures 4A, 4B, 4C:
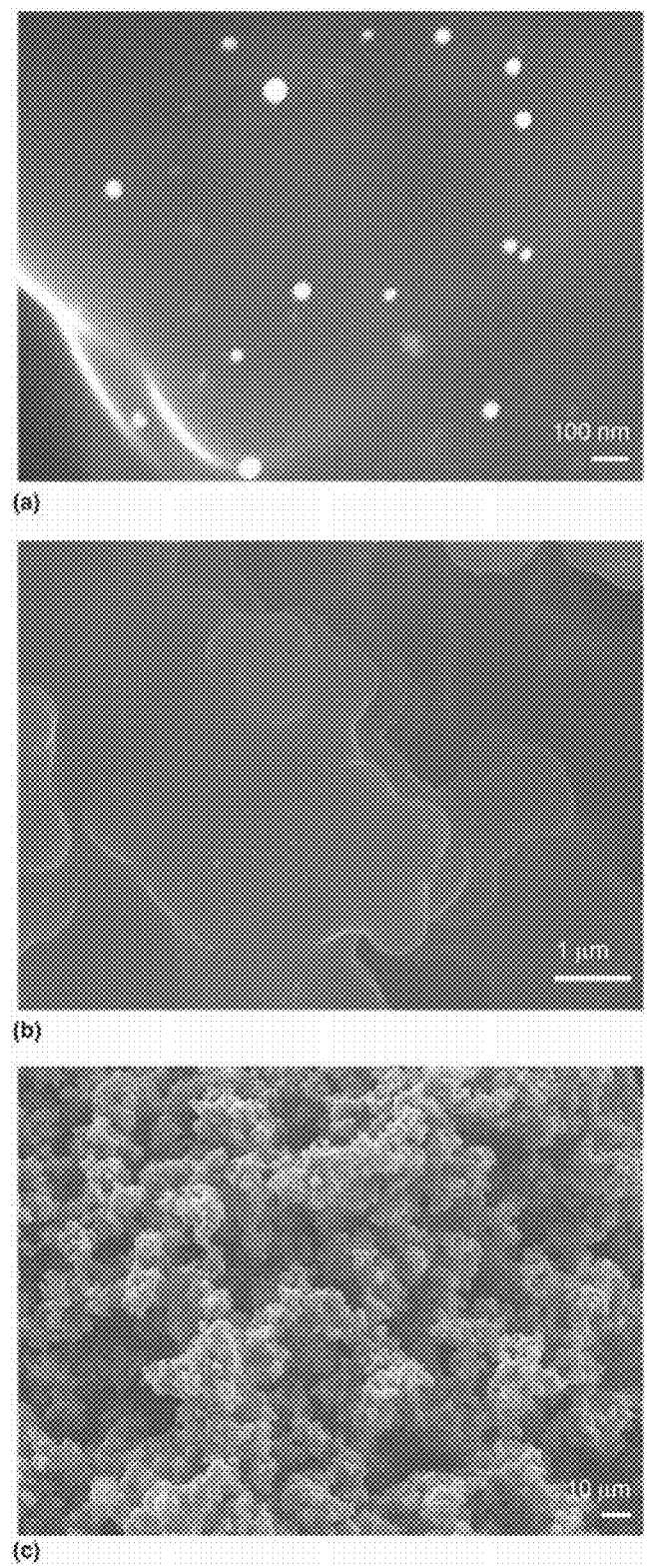
FIGS. 4A-4C are SEM images of 1 wt % Pd/C at different magnifications using secondary electron imaging.
Figures 5A, 5B, 5C:
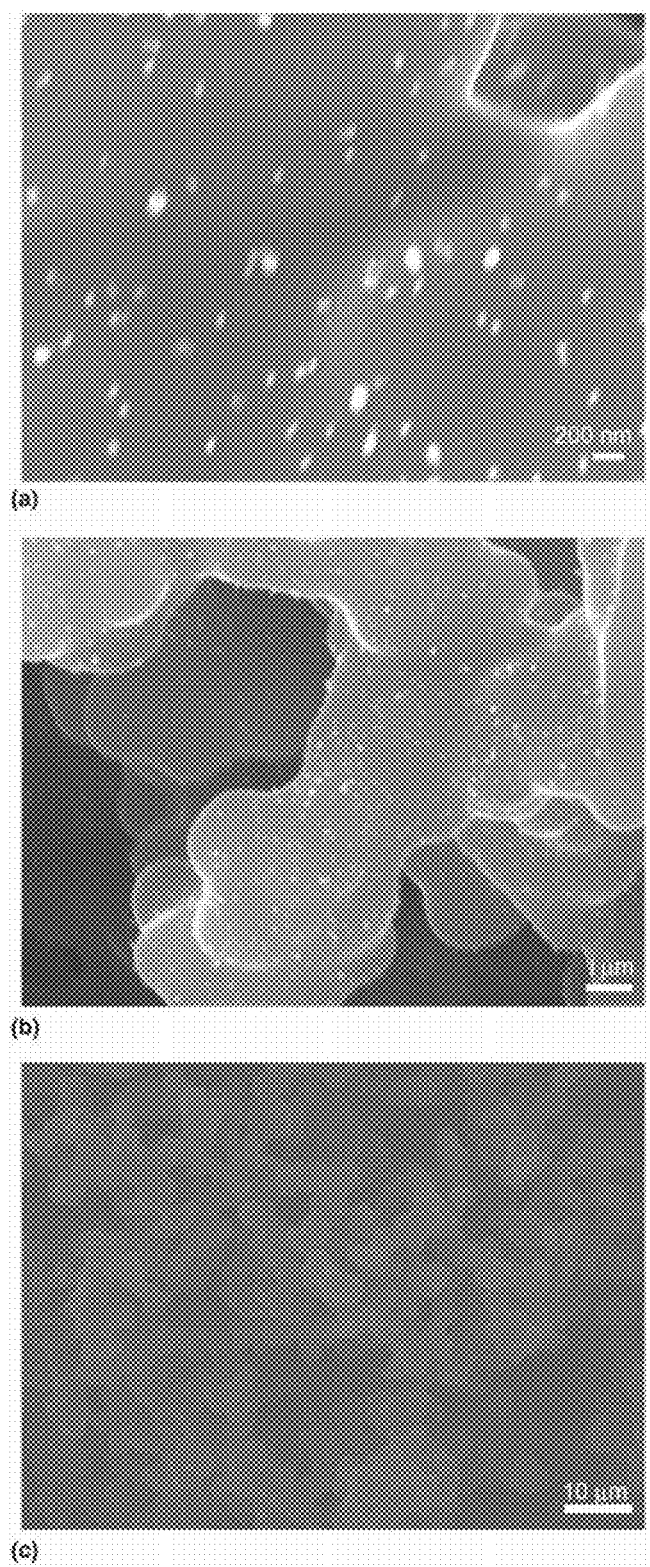
FIGS. 5A-5C are SEM micrographs of 5 wt % Pd/C at different magnifications using secondary electron imaging.

Scanning electron microscope (SEM) images were taken on a JEOL 7000 FE-SEM (Tokyo, Japan) with diode based back scatter electron detector equipped with an Oxford Energy Dispersive Spectroscopy (EDS) detector for elemental analysis at an accelerating voltage of 20 kV using secondary electron imaging detector. The SEM images of 1 and 5 wt % Pd/C (FIGS. 4A-4C and FIGS. 5A-5C, respectively) clearly show that the macroporous nature of the parent material is retained. For both materials, the images show the presence of a three-dimensional disordered sponge like macroporous network interconnected with ligaments of diameter <10 μm formed from the phase separation that occurred during the synthesis. The macropore diameters were in the range of 3-5 μm. Clearly, the incorporation of Pd during the synthesis did not affect the porous structure of the carbon support at this length scale as the structure matched the porous monoliths reported by Hao et al. (Structurally designed synthesis of mechanically stable poly(benzoxazine-co-resol)-based porous carbon monoliths and their application as high-performance $CO_2$ capture sorbents. *J. Am. Chem. Soc.* 133, 11378 (2011)). In case of 1 wt % Pd/C, the sizes of Pd particles were in the range of 20-60 nm (FIGS. 4A-4C). The Pd particles were in the range of 60-100 nm at higher loading i.e., 5 wt % Pd/C as seen in FIGS. 5A-5C. The Pd particles were found to be uniformly dispersed on the carbon support in both cases, and it was clearly seen that the Pd particles were also present in the crevices of the ligaments along with the ligament walls of the carbon support. No obvious agglomeration was observed in either material with all the Pd particles having spherical or elliptical shapes. This suggests that either migration of nanoparticles is limited during the time the carbon is at high temperature, or that the temperature is sufficiently high to allow complete coalescence of the Pd particles. The co-gelation technique gave a uniform distribution of Pd on the hierarchically porous carbon surface.

Figure 9:
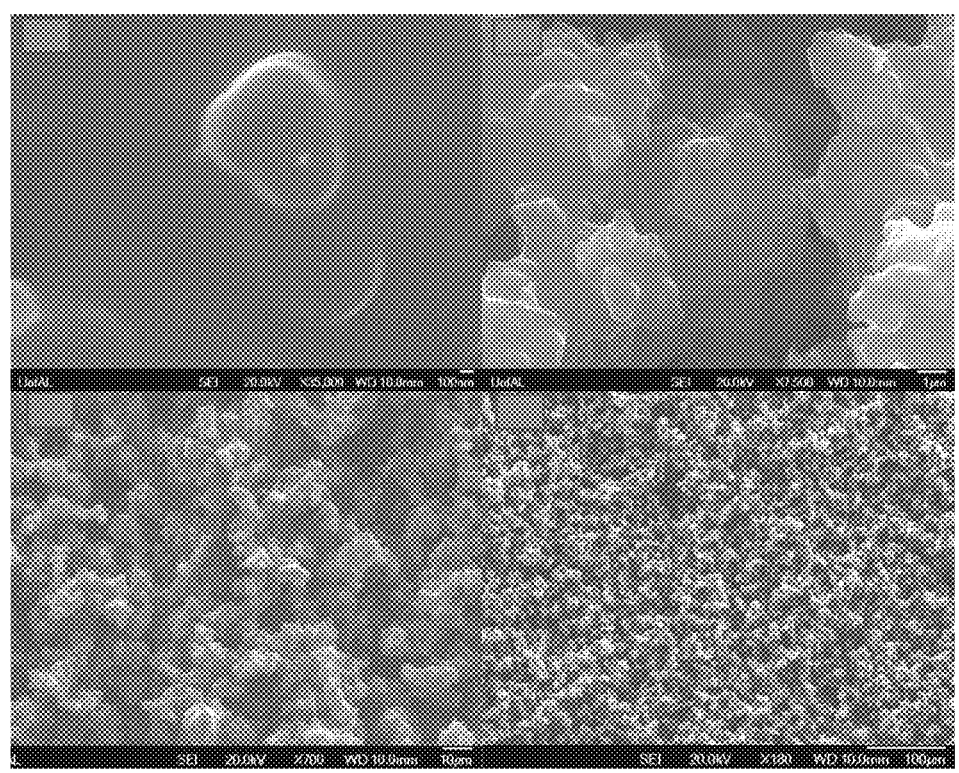
FIG. 9 is a group of SEM micrographs of 0.5% Ni/HPC at different magnifications using secondary electron imaging.
Figure 10:
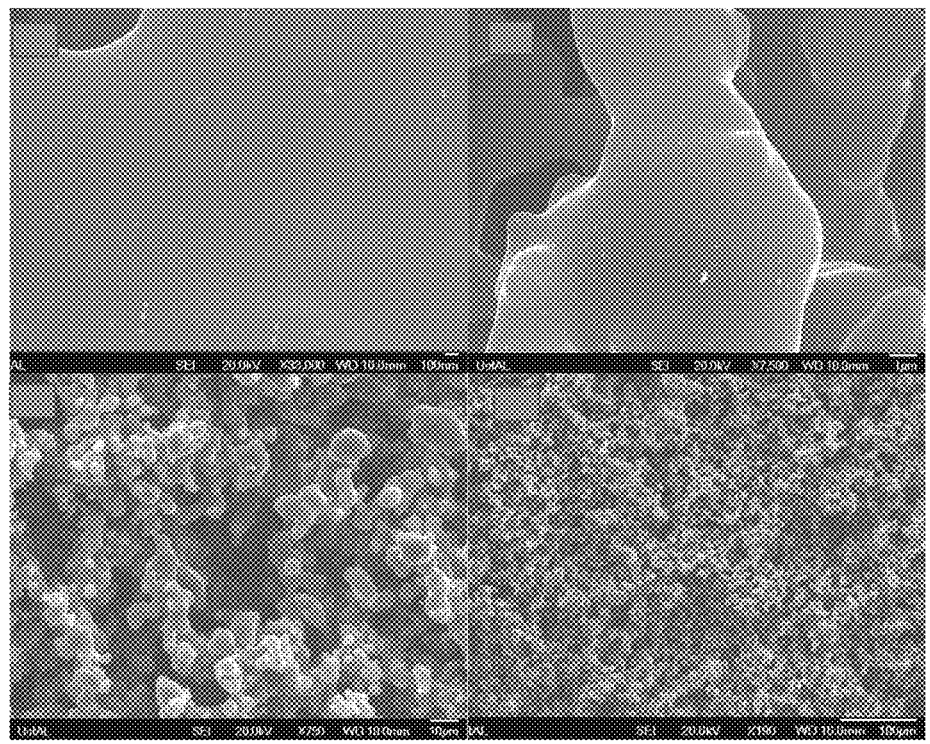
FIG. 10 is a group of SEM micrographs of 5% Ni/HPC at different magnification using secondary electron imaging.

The SEM images of 0.5% and 5% Ni/HPC (FIGS. 9 and 10, respectively) and of 1% and 2.5% Ni/HPC clearly show that the macroporous nature of the parent carbon material is retained. The SEM images of the materials exhibit a 3D, sponge-like, macroporous, continuous, network of interconnected ligaments of diameter <10 mm. The ligaments are formed due to the phase separation that occurs during the synthesis. From the SEM studies it is clearly evident that the incorporation of Ni nanoparticles did not affect the porous structure of the carbon support at this length scale as the structure is in good agreement with that reported elsewhere.

Additionally, as seen from the SEM images of the cross section of ligaments of the 1%, 2.5% and 5% Ni/HPC monoliths, the Ni nanoparticles grow on the surface of the ligaments and not within the ligament. Moreover, the SEM images of the edges of the monoliths showed that the Ni nanoparticles are more concentrated on the edges than in the center of the monolith. It was also observed that the Ni nanoparticles were densely populated in the crevices of the ligaments. In case of 0.5% Ni/HPC, very fine Ni nanoparticles of diameters 3-8 nm were observed. The size of the particles gradually increased with increase in Ni loading. Nanoparticles of 6-13 nm were observed for 1% Ni/HPC and 20-40 nm for 5% Ni/HPC. This showed that the sizes of particles were reasonably small even at high Ni loadings. Little or no obvious agglomeration of Ni nanoparticles was observed with all the particles being spherical, oval or elliptical in shape.

The SEM images of 1Cr/CA, 1Cr/CB and 1Cr/CC are shown in FIGS. 15A-15B, 16A-16B, and 17A-17B, respectively. Generally the SEM of images of HPC clearly show the macroporous nature with a 3D, sponge-like, continuous network of interconnected ligaments with smooth surfaces and a diameter <10 μm as reported. Unlike HPC, SEM of 1Cr/C materials showed a disrupted macroporous structure with a discrete network of ligaments (<10 μm) having rough surfaces showing that the addition of Cr has directly affected the texture of the carbon support. The Cr nanoparticles were seen to grow on the surface of the ligaments and into the support matrix as seen from the SEM of cross sections of ligaments. Generally, a range of fine and large Cr nanoparticles (23 nm-0.5 μm) were seen to have distributed all over the carbon matrix but the metal nanoparticles were not seen concentrated at the crevices of the ligaments or on the edges of monoliths as in the case of the Ni/HPC material.

Figures 18A, 18B, 18C:
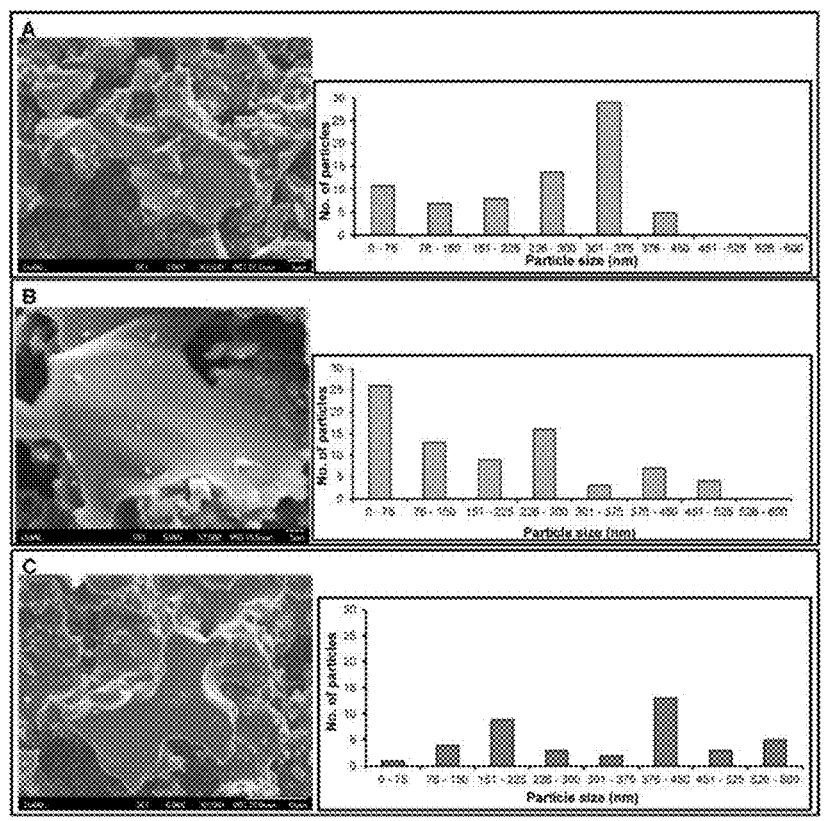
FIGS. 18A-18C show particle size distributions of 1Cr/CA (FIG. 18A); 1Cr/CB (FIG. 18B); and 1Cr/CC (FIG. 18C).

Particle size distribution studies of the samples revealed that Cr nanoparticles supported on HPC showed bimodal distribution as shown in FIGS. 18A-18C. Maximum numbers of finer Cr nanoparticles were seen in 1Cr/CB falling in the range of 0-75 nm followed by 1Cr/CA. The sample 1CrC/C showed presence of larger Cr particles and agglomerates with poor or no presence finer Cr nanoparticles. In case of 1Cr/C, maximum Cr particles were in the range of 0.37-0.4 μm which was not observed in case of 1Cr/CB. However, along with the presence of finer Cr nanoparticles, 1Cr/CA showed presence of larger Cr particles trending in the range of 0.3-0.37 μm. From the particle size distribution patterns, it showed that impact of synthesis route directly affected the Cr nanoparticle sizes in the final materials.

Example 9

FTIR Studies

The Fourier transform infrared (FTIR) spectra of the samples were recorded on a Bruker Vertex 70 FTIR, with software version Opus 5.5 and equipped with a Praying Mantis DRIFT attachment at ambient conditions with a resolution of 4 $cm^{-1}$ in the range of 4000-400 $cm^{-1}$ using 100 scans.

Figure 12:
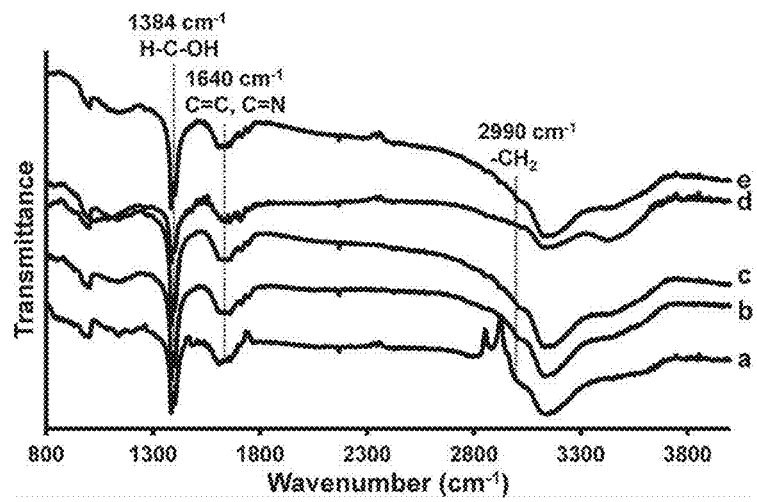
FIG. 12 is a FTIR spectra of HPC (line a), 0.5% (line b), 1% (line c), 2.5% (line d), and 5% (line e) Ni/HPC.

The FTIR spectroscopic investigations were carried out to identify the functional groups present on the Ni/HPC material (FIG. 12). The presence of various functional groups was observed in the spectra. The bands at 2990 and 1384 $cm^{-1}$ correspond to the asymmetrical stretching vibration of C—H(—$CH_2$) and the deformed vibration of H—C—OH, respectively. The peak at 1640 cm$^{-1}$ is assigned to the C1/4C and C1/4N vibrations which fall in the range of 1600-1700 cm$^{-1}$. The prominent band at 3430 cm$^{-1}$ implies the presence of residual hydroxyl groups, which can also be related to the peaks identified in the range of 1000-1300 cm$^{-1}$.

Example 10

Raman Studies

Figure 13:
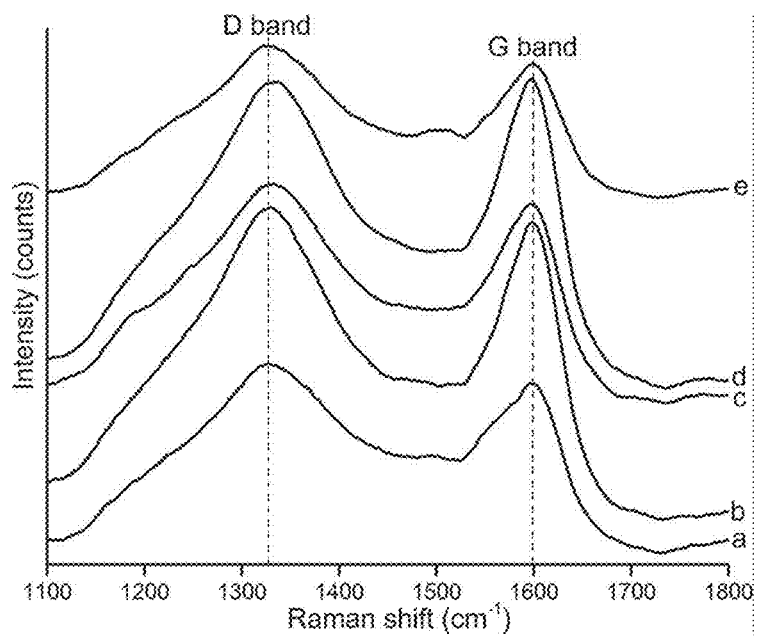
FIG. 13 is a Raman spectra of HPC (line a), 0.5% (line b), 1% (line c), 2.5% (line d), and 5% (line e) Ni/HPC.

The Raman scans were conducted using a Jobin-Yvon HR800 UV confocal microscope. The excitation line at 632.81 nm came from a He—Ne laser with approximately 12 mW of power at the sample. The shifts were detected using a Peltier cooled CCD detector. The image used a 10× objective lens and all scans were fixed using a 100× objective lens and scanned around the center of the as received monolith. The Raman spectra of the Ni/HPC samples shown in FIG. 13 exhibited bands at 1345 cm$^{-1}$ (D band) and 1609 cm$^{-1}$ (G band) which are attributed to the breathing modes of the rings and the bond stretching of all pairs of sp$^2$ carbon atoms in the polymeric carbon network. These bands arise from disordered graphitic carbon. The D band corresponds to the presence of six-fold aromatic rings. These observations were consistent with the data obtained from textural analysis and the SEM studies of the material.

Figure 20:
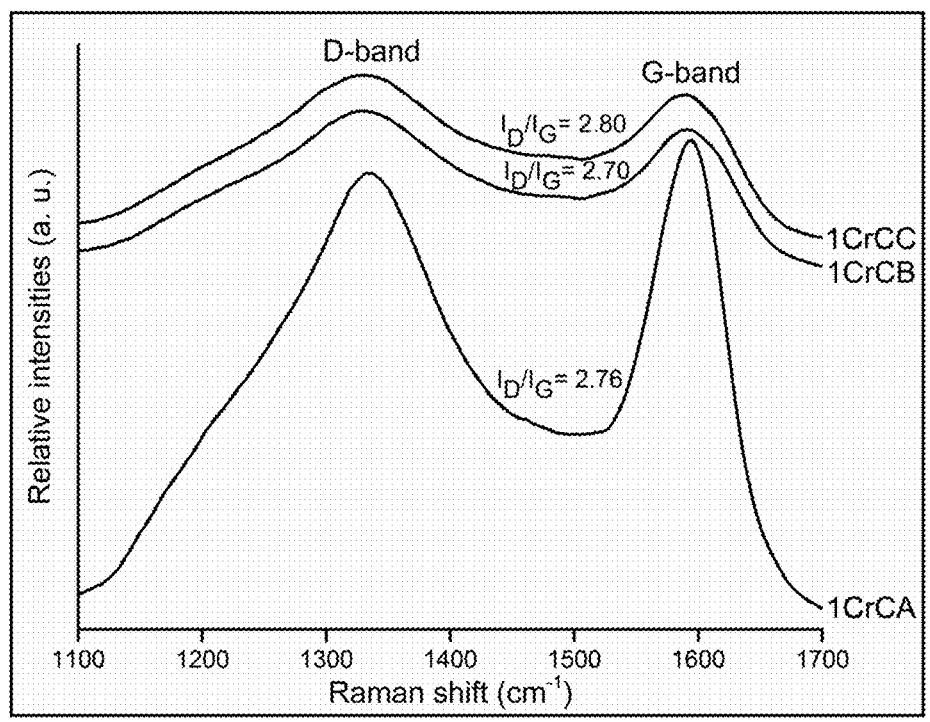
FIG. 20 is a Raman spectra of 1CrC samples.

The Raman spectra of 1Cr/C samples are shown in FIG. 20. The spectra exhibited two prominent bands at ~1334 cm$^{-1}$ (D-band) and ~1592 cm$^{-1}$ (G-band), which correspond to the breathing modes of rings and the bond stretching of pairs of sp2 carbon atoms in the polymeric carbon matrix. These bands arise as an outcome from disordered graphitic carbon. The D-band corresponds to the vibration of carbon atoms with dangling bonds in planar terminations of a disordered graphite-like structure formed from presence of six-fold aromatic rings in this case.

The G-band is a result of the E2g mode of graphitic carbon. The ratio of the intensities of the D and G bands in the Raman spectrum of carbon materials is widely used as a measure of degree of ordering (Stylianakis M M, et al., Efficient ternary organic photovoltaics incorporating a graphene-based porphyrin molecule as a universal electron cascade material. *Nanoscale*, 2015, 7, 17827-17835). The decrease in the ID/IG values illustrates that the ordering of carbon is improved thereby increase in the degree of graphitization. The trend observed in the ID/IG values follows 2.701 Cr/CB<2.761 Cr/CA<<2.801 Cr/CC which is in compliance with the trend observed for FWHM values.

Results Summary

Studies have shown that in the synthesis of direct carbon, the polymer produced has both mesostructure due to the templating effect of the non-ionic surfactant F127, and macrostructure due to a process known as spinodal decomposition which is basically the phase separation that occurs as the growing polymer starts becoming insoluble in the solvent (Liu Y-L, et al. Nitrogen-doped hierarchically porous carbon spheres as efficient metal-free electrocatalysts for an oxygen reduction reaction. *J. Power Sources*, 2015, 283: 389-396; Hillert, M. A Solid-Solution Model for Inhomogeneous Systems. *Acta Material*, 1961, 9: 525-535; Papon P, et al., Dynamics of Phase Transitions. In *The Physics of Phase Transitions*, 2006, 2: 37-77; Binder K, et al. Monte Carlo Methods for Estimating Interfacial Free Energies and Line Tensions. *J. Statistical Physics*, 2011, 144(3): 690-729; Nakanishi K. Pore Structure Control of Silica Gels Based on Phase Separation. *J. Porous Materials*, 1997, 4: 67-112). This phase separation occurs too rapidly for the polymer to simply precipitate. If the volume fraction of the polymer phase and the solvent phase are about equal, an intertwined network results. Curing of the material at higher temperature allows the resol condensation to cross-link the remaining resorcinol. This is in case of HPC in the absence metal nanoparticles. In the synthesis of Pd/C by one-pot sol-gel method, loss of surfactant template mesopores network was observed due to the Pd ions binding the DAH thereby preventing the self-assembly of DAH with the F127 copolymer resulting in mesopores. This was not the case when synthesis of Ni/HPC was performed. The distribution of Ni ions in the final carbon materials were concentrated in the water/ethanol phase and excluded from the growing polymer. This was expected in the present case where acetate was used as Cr metal precursor. However, the results clearly show that not only the metal precursor but also the addition order of the Cr precursor alters the textural properties of the final material.

In case of 1Cr/CA and 1Cr/CB, the surface areas decreased compared to HPC. During HPC synthesis, if the volume fraction of the polymer phase and the solvent phase are about equal, an intertwined network results. Excess water was used other than the solvent system to dissolve the Cr metal precursor. The addition of aqueous Cr salt solution might have assisted in retaining the homogeneity of the solution leading to the uniform dispersion of Cr in the carbon solution. Not much significant difference in the properties of 1Cr/CA and 1Cr/CB were observed although in both cases the addition of the Cr salt solution was performed 1) before addition of DAH and 2) after addition of formaldehyde, respectively. From this observation it might be suggested that irrespective of the addition sequence, the aqueous metal solution does not affect the resol-formaldehyde polymerization via Mannich reaction in presence of DAH as catalyst. Moreover, the metal solution is a part of the reaction mixture to give highly dispersed Cr nanoparticles in and on the carbon matrix. In case of 1Cr/CC, the powdered Cr salt was added directly after the addition of formalin. In this case the resol-formalin polymerization already initiates before the addition of Cr salt and the incorporation of Cr salt interrupts the formation of macropores and mesopores in the support as the Cr salt competes with the solvent present in the resorcinol solution for dissolution also enhancing the heterogeneity of the solution which is not desirable. However, the rate of polymerization seems faster than the dissolution of chromic acetate in the ethanol/water solvent system, giving rise to larger agglomerates of the Cr particles on the support. In all the samples the mesoporosity of the carbon support is lost which might be attributed to the clogging of pores due to deposition of Cr particles. The macroporosity of the carbon was disrupted which could be due to interference of Cr during the spinodal decomposition or phase separation leading to discreet macroporosity in the support.

Of all the samples, 1Cr/CB showed maximum ordering of the support immediately followed with 1Cr/CA evident from the FWHM and ID/IG values. This result can be correlated to the particle size of the Cr metal incorporated in the carbon support. Oya et al have reported that the size of metal particles affects the catalytic graphitization and ordering of the support Öya A, et al., Influences of particle size of metal on catalytic graphitization of non-graphitizing carbons. *Carbon*, 1981, 19(5): 391-400). Different sizes of metal species render varying effect in the ordering of the carbon support. Fine particles assist in the formation of ordered graphitic carbon whereas larger particles adversely affect the ordering. In the present case, the particle size distribution studies showed the presence of maximum number of fine particles in 1Cr/CB monolithic materials and large numbers of agglomerates were seen to form in 1Cr/CC sample, thus showing the formation of more ordered 1Cr/CB material and the trend followed was 1Cr/CB>1Cr/CA>1Cr/CC. This observation is in well agreement with observations obtained from the XRD and Raman analysis.

The mesostructure of the monoliths is produced by the presence of F127 and the interaction of the F127 with DAH. On addition of formaldehyde a Mannich reaction occurs leading to formation of a benzoxazine ring (Y. Yagci, et al., Recent advancement on polybenzoxazine—a newly developed high performance thermoset, *J. Polym. Sci. Part A: Polym. Chem.* 47 (2009) 5565-5576). Both ends of the diamine, and both hydroxyl groups on the resorcinol can form benzoxazines, leading to formation of a benzoxazine-resorcinol co-polymer]. As this polymer forms it becomes insoluble in the solvent leading to the spinodal decomposition that produces the macropores. In the synthesis of Pd/C by a one-pot method it was concluded that the loss of the surfactant templated mesopore network was due to the Pd ions binding the DAH and so preventing the self-assembly of DAH with the F127 block co-polymer that gives the mesopore network. This does not appear to be the case here as there is only a very modest change in pH due to $Ni^{2+}$ addition, and no evidence from viscosity measurements to suggest the formation of a Ni/DAH polymer.

The distribution of Ni in the final carbon material is consistent with the Ni ions being concentrated in the water/ethanol phase and excluded from the growing polymer. The Ni nanoparticles are found to be concentrated primarily on the macropore walls rather than in the body of the ligaments. The Ni nanoparticles are also seen to be more concentrated in areas of higher surface curvature. This behavior was also observed in preparing supported catalysts by solution infiltration. As the solution containing the metal salt dries the vapor pressure is lower for water droplets in crevices and at curved surfaces so metal ions are concentrated at these locations, leading to a higher concentration of metal particles. Further, higher densities of Ni nanoparticles (Kotbagi, T. V., et al., *Materials Research Bulletin* 2016, 73, 204-210) are observed towards the external surface of the monoliths. Such behavior is also consistent with solvent drying phenomena and can be used to give "egg-shell" catalysts (Nelmark, A. V., et al., Theory of preparation of supported catalysts, *Ind. Eng. Chem. Prod. Res. Dev.* 1981, 20, 439-450). The possibility that Ni nanoparticles are preferentially formed on the macropore surface due to migration of metallic Ni during the carbonization process cannot be completely ruled out, but such migration within carbon will be very slow at the relatively low temperature used (500° C.). Further, such migration would not lead to increased Ni nanoparticle densities at curved surfaces, nor the higher Ni nanoparticle density observed near the outside of the monoliths. The weight of evidence therefore seems to suggest that the $Ni^{2+}$ ions remain dissolved in the ethanol/aqueous phase after spinodal decomposition.

Banadara et al. have reported that transition metal ions, including $Ni^{2+}$, associate with the oxygen atoms of polyethylene oxide polymers (Bandara, H. M. N., et al., Comparison of the cation environment in polymer electrolytes based on poly(ethylene oxide) and transition-metal bromides, *J. Chem. Soc. Faraday Trans.* 90 (1994) 3549-3553). Since the $Ni^{2+}$ does not appear to be binding the DAH and is not strongly incorporated into the growing polymer, the most likely explanation for the observed lack of mesopores is that Ni is binding to the F127, thereby increasing the F127 concentration in the ethanol/water phase, and decreasing the concentration in the growing polymer phase.

The co-gelation technique is disclosed for the synthesis of hierarchically porous monoliths containing metals, e.g., Pd/C, Cr/C, Ni/HPC. The final structures showed the presence of both meso and macropores that are expected to be beneficial for heterogeneous catalysis where reactants and products diffuse to the internal surface of the carbon support for access to the active metal species present in the pores. Batch hydrogenations of styrene showed that the crushed Pd/C monoliths have similar catalytic activity to the commercial catalyst. Leaching tests showed that the Pd/C materials synthesized by the co-gelation technique were comparable to the JM catalysts in loss of Pd. The shorter synthesis makes these materials of potential commercial interest.

Hierarchically porous carbon supporting nickel nanoparticles was successfully synthesized using a facile one-pot co-gelation sol-gel method. The presence of a hierarchically porous network in the final structure and the small metal (nickel) nanoparticles on the surface of the porous support, suggest that these materials could have potential as heterogeneous catalysts where diffusion of the reactant and product molecules through the internal surface to access the active metal particles can be readily achieved. The cost savings expected from the one-pot synthesis procedure described herein makes these materials of potential commercial interest. The monolithic forms of the materials can be suitably employed in microreactors under flow conditions.

The present disclosure showed that the order of addition using an aqueous solution of a chromium salt did not significantly affect the final textural properties of the monoliths. However, addition of salt powder affected the properties of the material in terms of particle size and ordering of the carbon support. The incorporation of Cr metal onto the carbon support significantly impacted the mesostructure of the carbon support. The Cr nanoparticles are seen to grow on and into the ligaments of the carbon support, which indicates uniform dispersion of metal nanoparticles on the support matrix. The Cr nanoparticles were not seen to have concentrated in the crevices of the ligaments unlike Pd/C and Ni/HPC. The reason for this unusual behavior remains obscure. The study herein has helped develop a technique for the synthesis of chromium supported on hierarchically porous monolithic carbon support having a very high surface area, fine and uniformly distributed metal nanoparticles on the support. To obtain even smaller Cr nanoparticles and using the material for various batch mode oxidation reactions is ongoing. The monolithic form of the chromium on carbon produced from a one-pot co-gelation method makes it particularly suitable for use in flow reactors and the best material in the series will be screened for various oxidation reactions under flow conditions.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A method of synthesizing a hierarchically porous carbon monolith, comprising:
   combining a second polymer precursor with a solution comprising a first polymer precursor, a surfactant, and metal complex, wherein the metal complex has a stability constant of at least 0;
   polymerizing the first and second polymer precursors, thereby producing a polymer monolith via spinodal decomposition; and then
   carbonizing and reducing the polymer monolith with a reducing agent, thereby producing the hierarchically porous carbon monolith.

2. The method of claim 1, wherein the solution further comprises a crosslinking agent.

3. The method of claim 2, wherein the crosslinking agent is selected from the group consisting of 1,6-diaminohexane, lysine, 1,5-diaminopentane, 1,7-diaminoheptane, 1,8-aminooctane, and dicyandiamide.

4. The method of claim 1, wherein the solution further comprises an alcohol, water, or a mixture thereof.

5. The method of claim 1, wherein the metal complex comprises Ti, V, Cr, Mn, Fe, Co, Ni, Cu, Zr, Nb, Mo, Tc, Ru, Rh, Pd, Ag, Hf, Ta, W, Re, Os, Ir, Pt, Au, La, Ce, Pr, Nd, Pm, Sm, Eu, Gd, Tb, Dy, Ho, Er, Tm, Yb, or combinations thereof.

6. The method of claim 1, wherein the metal complex is selected from the group consisting of $Ni(CH_3CO_2)_2(H_2O)_4$, $Pd(NH_3)_4Cl_2H_2O$, and $Cr_2(CH_3CO_2)_4(H_2O)_2$.

7. The method of claim 1, wherein the metal complex has a stability constant of from 0 to 50.

8. The method of claim 1, wherein the metal complex comprises ligands that are organic acids.

9. The method of claim 8, wherein the ligands are acetate or citrate.

10. The method of claim 1, wherein the surfactant is poloxamer 407.

11. The method of claim 1, wherein the first polymer precursor is selected from the group consisting of resorcinol, phenol, phloroglucinol, 1,3-dichlorobenzene, 1,3-dibromobenzene, 1,3-ditosylatebenzene, 1,3-diaminobenzene, 1,3-dinitrobenzene, and 1,3-diiodobenzene.

12. The method of claim 1, wherein the second polymer precursor is selected from the group consisting of formaldehyde, formalin, acetaldehyde, propionaldehyde, butyraldehyde, acetophenone, glyoxal, paraformaldehyde, s-trioxane, methyal, and dimethoxymethane, and benzaldehyde.

13. The method of claim 1, wherein the first polymer precursor is resorcinol and the second polymer precursor is formaldehyde.

14. The method of claim 1, wherein the polymer monolith is transferred to a mold after polymerizing the first and second polymer precursors.

15. The method of claim 1, wherein the polymer monolith is heated while being reduced with a reducing agent.

16. The method of claim 1, wherein carbonizing and reducing is by heating the polymer monolith to from 450° C. to 800° C. under an inert atmosphere.

17. The method of claim 16, wherein the polymer monolith is further heated to from 800° C. to 1100° C.

18. The method of claim 1, wherein the reducing agent is selected from the group consisting of hydrogen, alcohol, polyol, carboxylic acid, aldehyde, hydrazine, hydride, and borane.

* * * * *